United States Patent
Aral et al.

(10) Patent No.: US 10,740,028 B1
(45) Date of Patent: Aug. 11, 2020

(54) METHODS AND APPARATUS FOR LRU BUFFER MANAGEMENT IN PERFORMING PARALLEL IO OPERATIONS

(71) Applicant: DataCore Software Corporation, Fort Lauderdale, FL (US)

(72) Inventors: Ziya Aral, Pompano, FL (US); Nicholas C. Connolly, Purley (GB); Robert Bassett, Pensacola, FL (US); Roni J. Putra, Pompano Beach, FL (US)

(73) Assignee: DataCore Software Corporation, Fort Lauderdale, FL (US)

( * ) Notice: Subject to any disclaimer, the term of this patent is extended or adjusted under 35 U.S.C. 154(b) by 69 days.

(21) Appl. No.: 15/690,807

(22) Filed: Aug. 30, 2017

(51) Int. Cl.
*G06F 3/06* (2006.01)
(52) U.S. Cl.
CPC ............ *G06F 3/0656* (2013.01); *G06F 3/067* (2013.01); *G06F 3/0613* (2013.01); *G06F 3/0664* (2013.01)
(58) Field of Classification Search
CPC .... G06F 3/0656; G06F 3/0613; G06F 3/0664; G06F 3/067
See application file for complete search history.

(56) References Cited

U.S. PATENT DOCUMENTS

| | | | | |
|---|---|---|---|---|
| 4,715,030 A * | 12/1987 | Koch | ..................... | G06F 13/387 370/401 |
| 6,853,643 B1 * | 2/2005 | Hann | ..................... | H04L 49/103 370/413 |
| 7,730,238 B1 * | 6/2010 | Arulambalam | ........... | G06F 5/06 370/412 |
| 8,526,326 B1 * | 9/2013 | Gill | ..................... | H04L 49/9015 370/254 |
| 2008/0250203 A1 * | 10/2008 | Schreter | ..................... | G06F 9/52 711/117 |
| 2009/0086737 A1 * | 4/2009 | Fairhurst | ................. | H04L 49/90 370/394 |

OTHER PUBLICATIONS

Wikipedia; Data Structures; Jul. (Year: 2017).*

* cited by examiner

*Primary Examiner* — Ramon A. Mercado
(74) *Attorney, Agent, or Firm* — Michael Best & Friedrich LLP

(57) ABSTRACT

An LRU buffer configuration for performing parallel IO operations is disclosed. In one example, the LRU buffer configuration is a doubly linked list of segments. Each segment is also a doubly linked list of buffers. The LRU buffer configuration includes a head portion and a tail portion, each including several slots (pointers to segments) respectively accessible in parallel by a number of CPUs in a multicore platform. Thus, for example, a free buffer may be obtained for a calling application on a given CPU by selecting a head slot corresponding to the given CPU, identifying the segment pointed to by the selected head slot, locking that segment, and removing the buffer from the list of buffers in that segment. Buffers may similarly be returned according to slots and corresponding segments and buffers at the tail portion.

18 Claims, 32 Drawing Sheets

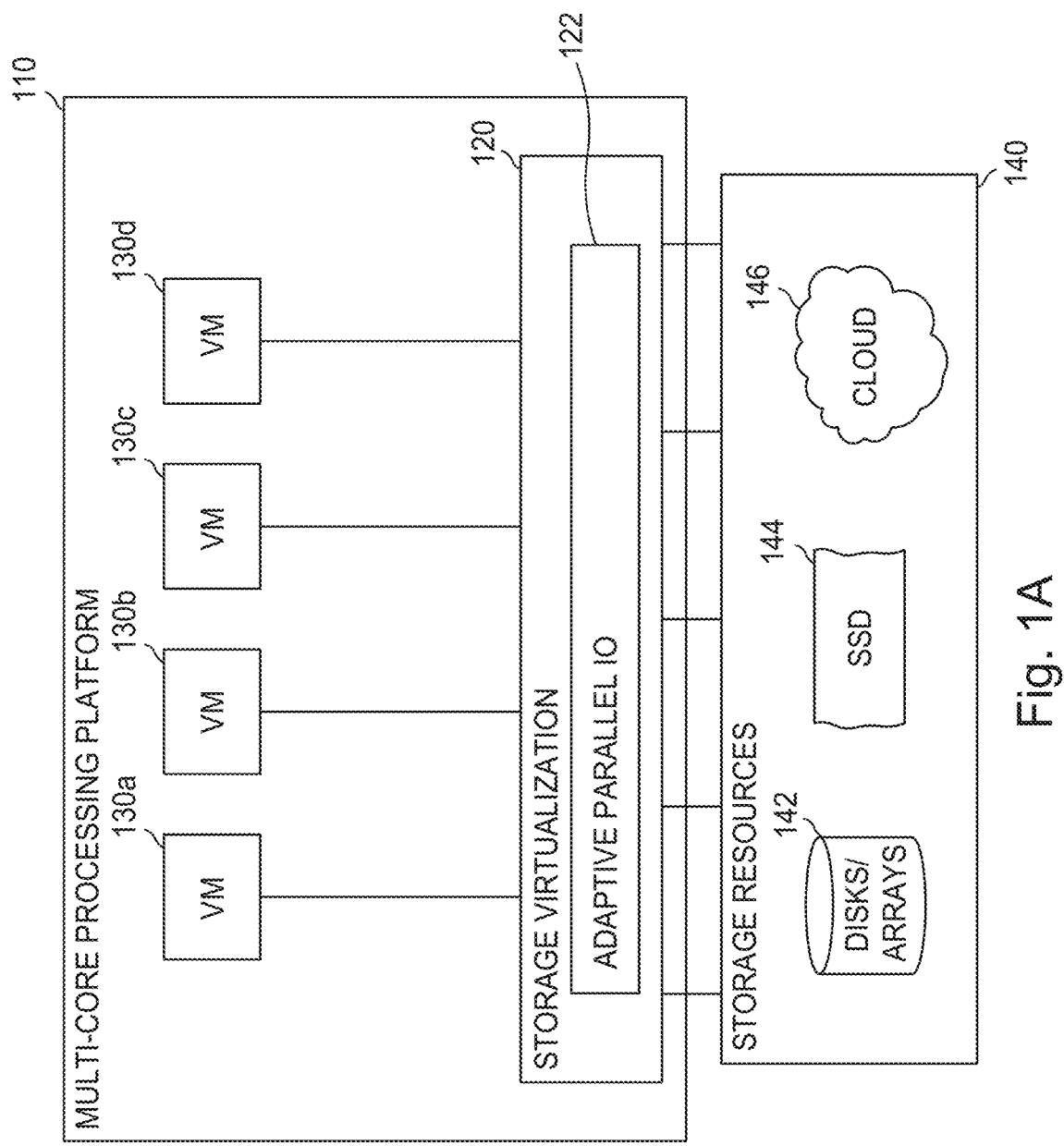

METHODS AND APPARATUS FOR LRU BUFFER MANAGEMENT IN PERFORMING PARALLEL IO OPERATIONS

BACKGROUND OF THE INVENTION

Field of the Invention

This invention relates generally to storage virtualization, more particularly to executing IO requests in parallel, and still more particularly to LRU buffer management in relation to executing the IO requests.

Description of the Related Art

What is needed is storage virtualization that performs IO operations in parallel, in particular in a multi-core processing environment. What is also needed is updating processes that support the performance of IO operations in parallel from typical sequential execution into parallel execution.

SUMMARY OF THE INVENTION

The embodiments of LRU buffer management disclosed herein provide solutions for bottlenecks and contention that prevent multicore platforms from realizing their full parallel processing potential.

For example, an LRU buffer configuration for performing parallel IO operations is disclosed. In one example, the LRU buffer configuration is a doubly linked list of segments. Each segment is also a doubly linked list of buffers. The LRU buffer configuration includes a head portion and a tail portion, each including several slots (pointers to segments) respectively accessible in parallel by a number of CPUs in a multicore platform. Thus, for example, a free buffer may be obtained for a calling application on a given CPU by selecting a head slot corresponding to the given CPU, identifying the segment pointed to by the selected head slot, locking that segment, and removing the buffer from the list of buffers in that segment. Buffers may similarly be returned according to slots and corresponding segments and buffers at the tail portion.

The present invention can be embodied in various forms, including computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIGS. 1A-B are block diagrams illustrating systems with storage virtualization with adaptive parallel IO.

DETAILED DESCRIPTION OF THE INVENTION

Figure 1B:
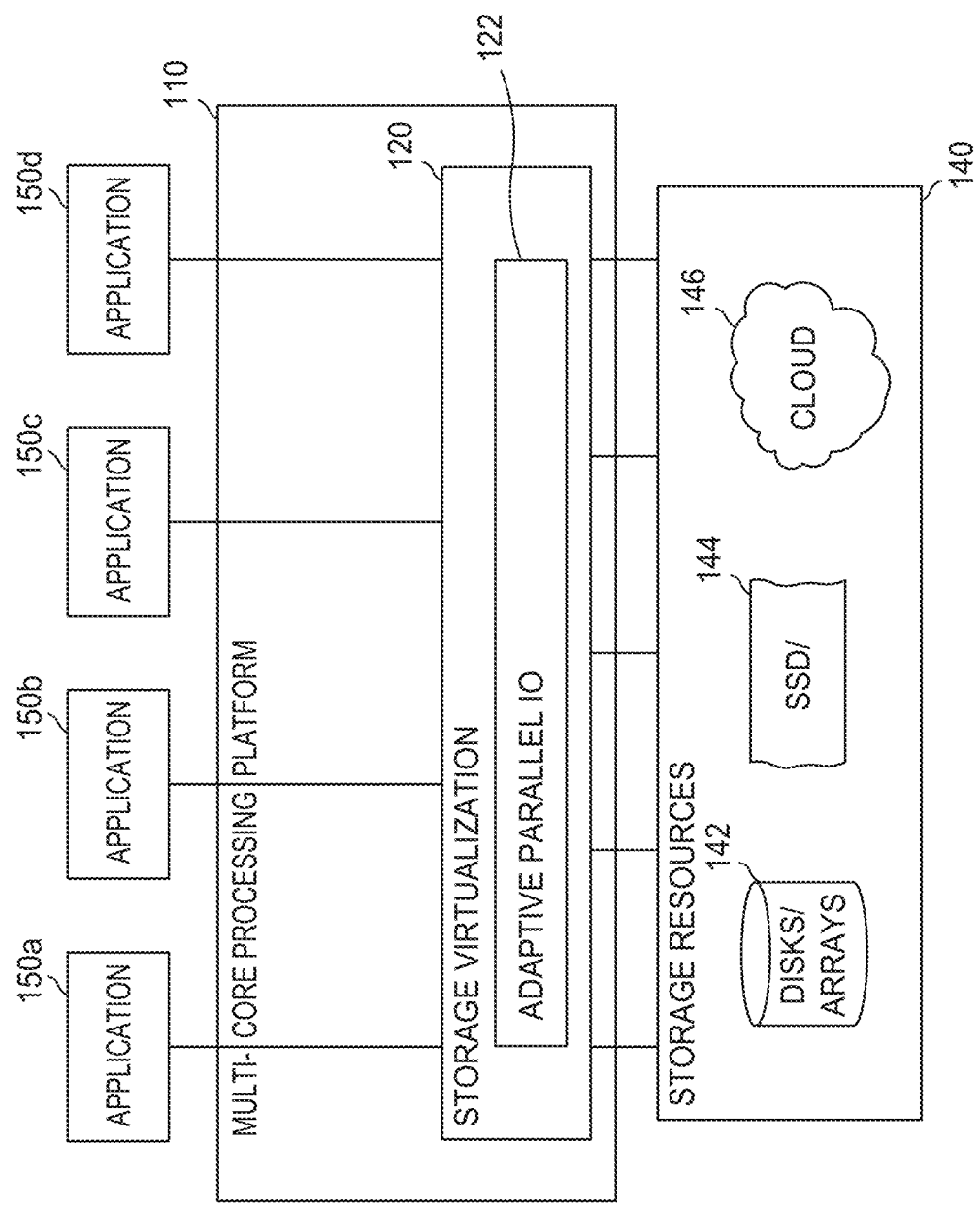

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

FIG. 1A is a block diagram illustrating a multi-core processing platform 110 configured to include a storage virtualization (SV) component 120 with an adaptive parallel IO (APIO) component 122. The multi-core processing platform 110 includes multiple cores (CPUs) that are configured to execute tasks in parallel. The SV component 120 provides traditional features such as the presentation of virtual disks to any number of virtual machines (VM 130a-d). The VMs 130a-d respectively direct IO requests to the presented virtual disks. The SV component 120 responds to these requests and manages underlying storage resources 140. The SV component 120 also provides a variety of conventional storage management facilities in relation to the presented virtual disks, including disk snapshots, disk mirroring, caching, etc.

The SV component 120 is configured to present the virtual disks to the VMs 130a-d, and to respond to IO requests in a fashion that allows the respective VMs 130a-d to merely "see" and interact with the disks, while the SV component 120 handles all of the underlying organization and management of storage operations and the corresponding management of the storage resources 140.

Multi-core processing is well known, and it is known to distribute processing tasks among respective CPUs. However, storage operations have continued to essentially operate serially. Even where multiple cores are available to execute storage operations, to ostensibly provide parallel processing, there remains a significant bottleneck in that storage operations are received and processed serially. That is, an IO handler typically processes all of the incoming IO requests from various requestors, and then sequences them accordingly. Even if the IO requests originate among multiple CPUs, the organization and performance of the IO requests within the operating system is still undertaken in essentially serial form. Problematic delay-causing IO requests are simply embedded among the tasked cores, so a variety of IO processing log jams remain present.

In one aspect, the embodiments described herein accommodate actual usage of the efficiencies of multicore architectures by changing the way IO scheduling is performed to maximize parallelism on a multicore platform. This, along with emulating block storage devices using software, CPU, storage devices, and RAM, creates the opportunity to complete most I/O requests in microseconds.

The APIO component 122 is configured to enable the execution of numerous IO request streams simultaneously in parallel among multiple CPUs. The APIO component 122 also adaptively invokes available CPUs into the IO request stream processing to dynamically make use of any available processing resources. Still further, the APIO component 122 filters IO requests so that immediately serviceable IO operations are processed in parallel, while (less frequent) delay-causing IO operations are forwarded for ordinary IO sequencing. Due to caching features in the SV component 120, the delay-causing IO operations are relatively small in number, so the APIO component 122 provides very significant increases in overall performance by allowing all of the other, relatively fast IO operations (i.e., the vast majority of IO operations) to essentially execute synchronously in parallel.

The adaptive parallel IO processing of the APIO component 122 is not limited to environments with virtual machines (or applications) co-resident on the multi-core processing platform. FIG. 1B illustrates an example where the APIO component 122 remains resident on the multi-core processing platform 110, but respective applications 150a-d reside elsewhere.

Figure 2A:
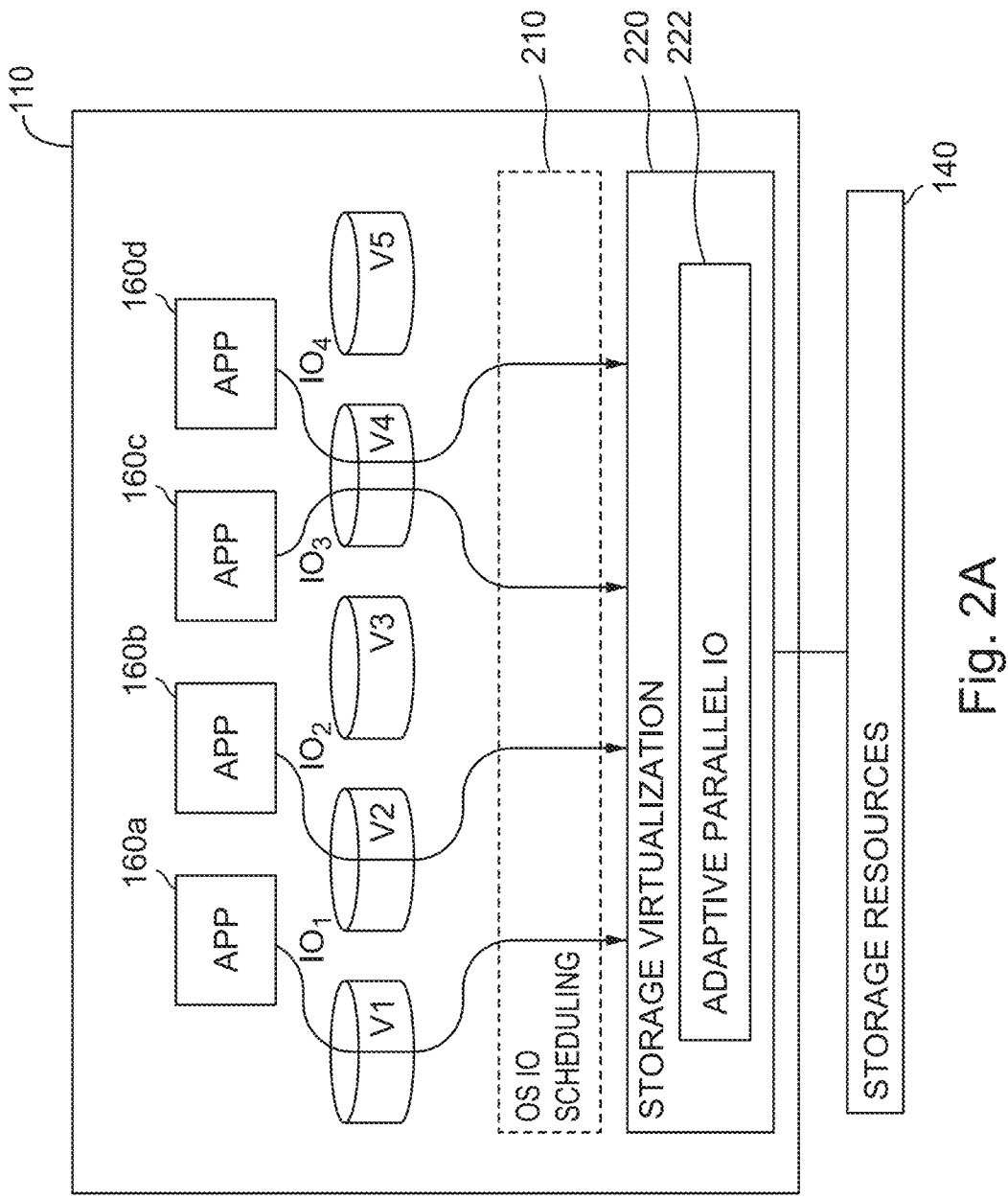
FIG. 2A-B are block diagrams illustrating an example of storage virtualization with adaptive parallel IO.

FIG. 2A is a block diagram illustrating an example of storage virtualization with an SV component 220 equipped to perform parallel bypass. In parallel bypass, IO requests are handled directly on application threads (e.g., IO1-IO4). As mentioned above, the SV component 220 presents virtual disks V1-V4 to various applications 160a-d. For example, a first application 160a may be presented a virtual disk V1, and may direct an IO request to that virtual disk V1 accordingly. An IO request may be a read or write operation, but may also be a control code.

Similarly, additional threads IO2-4 respectively correspond to other applications 160b-d. As evident from the figures, there is not necessarily a one-to-one correlation of applications to virtual disks. Thus two applications 160c-d may both be presented with a given virtual disk V4 and may direct IO requests accordingly.

In a conventional approach, IO requests are passed to an OS IO scheduling component, which receives and schedules IO requests while the applications wait for them to be completed and returned. Specifically, an application 160a-d makes an IO request and receives an acknowledgement through the OS that the IO request is pending. Meanwhile, the OS IO scheduling component queues the IO request in a different context. The IO request then progresses through the sequence of operating system layers for processing. Ultimately, the IO request is completed, the device interrupts the CPU, and a callback is made to the application to indicate completion of the IO request (e.g., in the original context to the application). This kind of loopback approach is repeatedly performed for each IO request. There is overhead associated with each request. In a parallel environment, this overhead increases nonlinearly, exacerbating latency and lengthening application response time greatly.

By contrast, the APIO component 222 receives the indication of IO requests before they pass under the control of the OS IO scheduling component. The APIO component 222 first receives the IO requests and determines whether the OS IO scheduling component can be bypassed. For example, the APIO component may bypass the operating system IO scheduling component in the event of a read that is a cache hit, or in the event of any optionally cached write operation. It may also bypass the operating system IO scheduling component based upon the availability of parallel processing resources, which in turn can be determined by the number of available CPUs, QOS determinations, and/or respective demand levels for IO requests and application task/function processing.

Figure 2B:
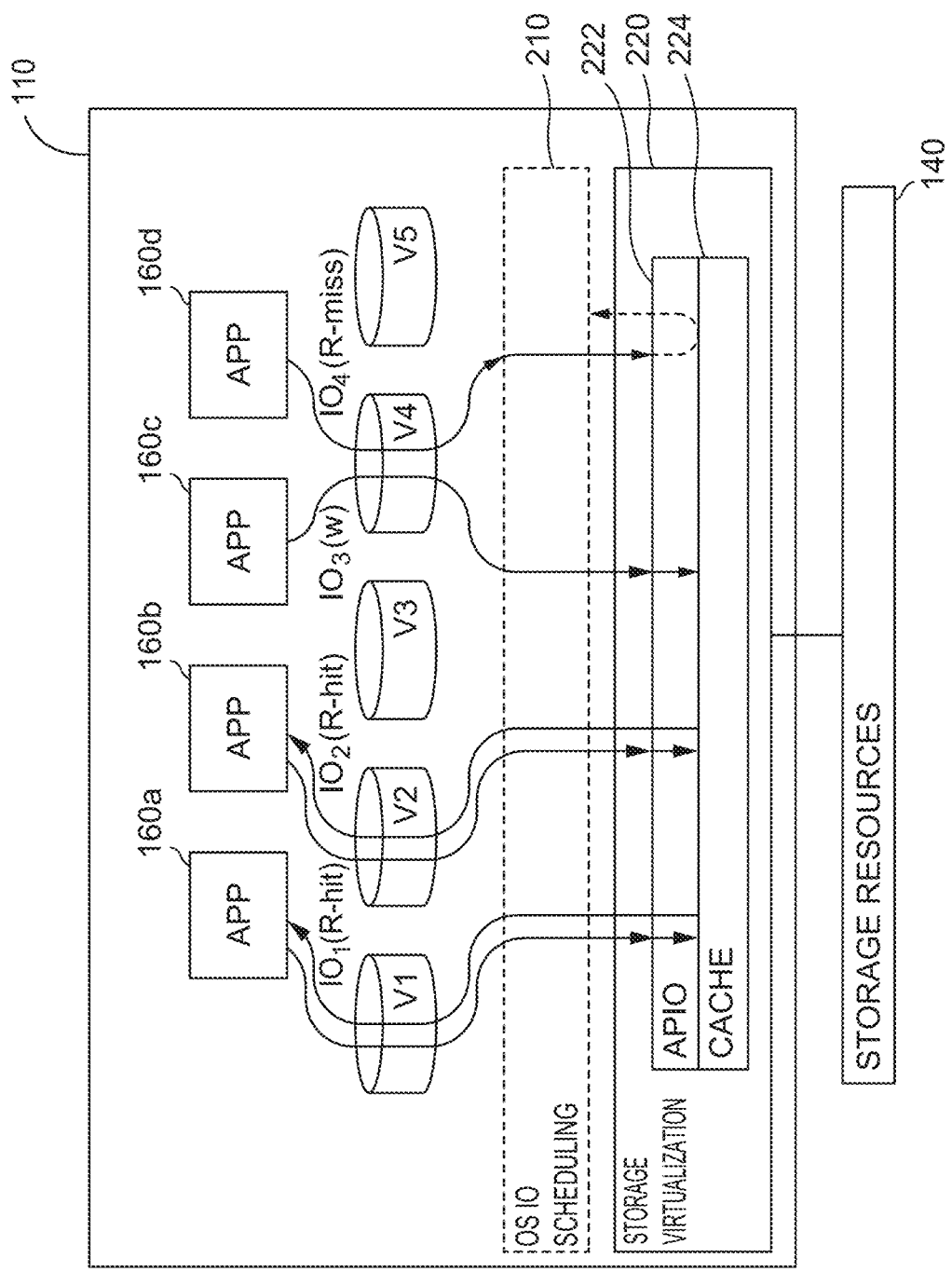

FIG. 2B illustrates the SV component 220 to include a disk block cache. It also illustrates various examples of threads IO1-IO4. By way of example, in the event of a read that is a cache hit (thread IO1 or IO2), the IO request is intercepted, the OS IO scheduling component is not invoked, and the read can be returned directly to the application without incurring a context change. In the event of a cached write operation, the write is immediately acknowledged to the application as successful, again with no OS IO sequencing and no context change. The cached write can be "dumped" into the SV component 220, which reconciles the actual writing of the data to storage resources 140 (and tracking for intervening reads). If desired, if a write queue starts to become overloaded, the OS IO sequencing component can be invoked to allow the write queue to be processed. Alternatively, additional parallel processing resources (e.g., more CPUs) can be invoked to handle times of high IO request demand. Essentially, the write therefore processes with the efficiency of a read cache hit. Finally, a cache miss (thread IO4) may be cycled back to OS IO scheduling 210. But even on a cache miss, the cache is updated to reflect the more recent data, expediting subsequent reads to that data. And still further, if desired and available, additional resources may also be used to handle a cache miss without having to loop back to the OS IO scheduling component, for example to read a high-speed NVMe device in polled mode, avoiding CPU interrupts. As such, the vast majority of IO requests are immediately processed and returned to the application successfully, without the context change or other delays typically introduced by OS IO scheduling 210.

With the APIO component 222, the processing of IO requests is as though the application threads have their data attached to them in a thread-local context. The requests are directly completed with function calls, without queueing, and without loopbacks and corresponding context switching. This avoids thrashing between IO scheduling threads and application threads, avoids device programming and subsequent CPU interrupts, and significantly improves the processing of IO requests in a multi-core environment.

Figure 3:
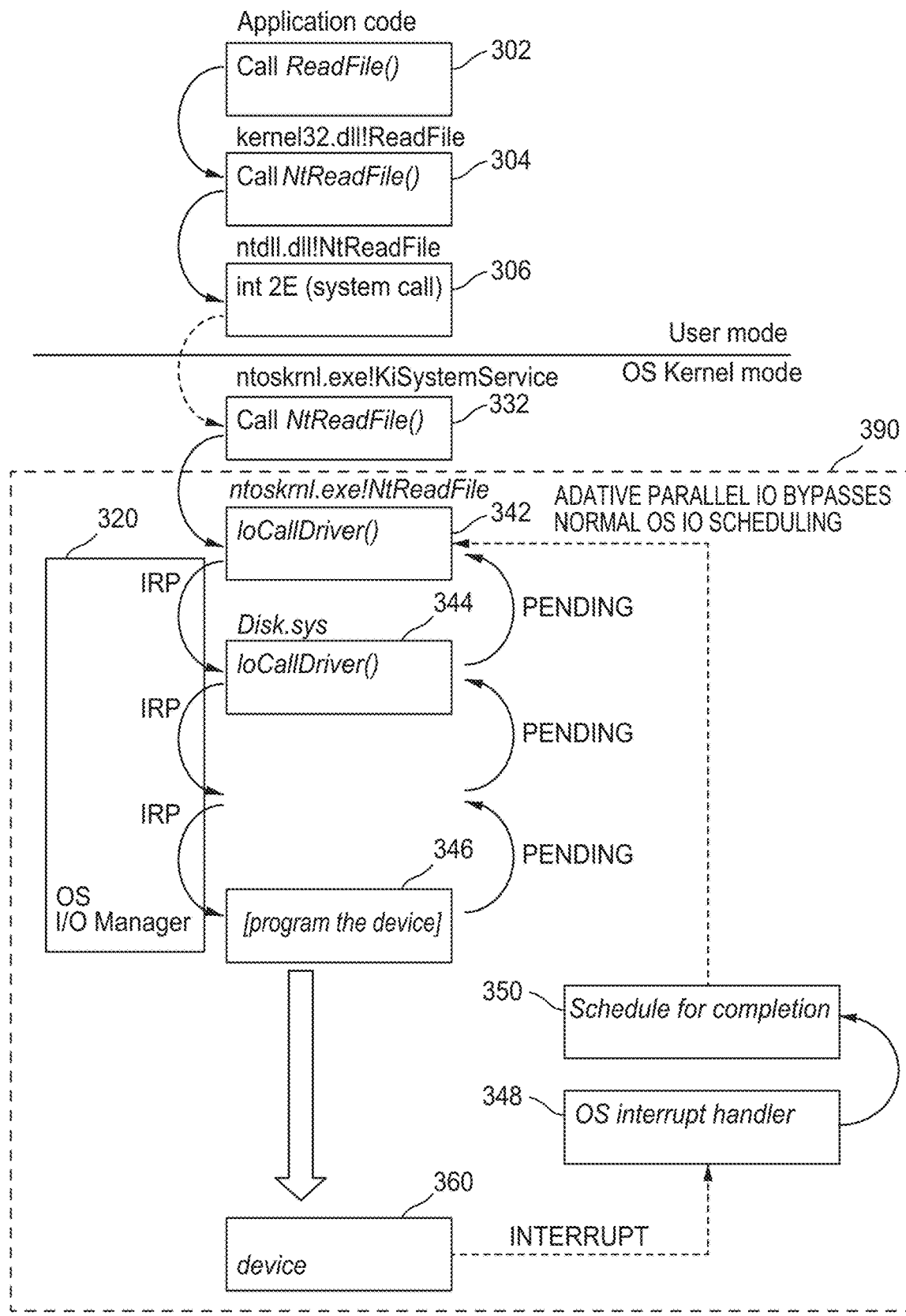
FIG. 3 is a block and flow diagram illustrating an example of OS IO scheduling that is bypassed in storage virtualization with adaptive parallel IO.

FIG. 3 is a block and flow diagram illustrating an example 300 of aspects of OS IO scheduling 390 that are bypassed using the SV component having an APIO component. Although one example of an OS is a Windows operating system, adaptive parallel IO as described herein is applicable to any OS.

It is useful to consider how a disk read operation is normally handled to appreciate how the APIO component avoids various latencies.

Any application may initiate an IO request in connection with an application thread, such as a read request (e.g., Call ReadFile( ) (302)). Following this, the application code transfers to the Win32 API NtReadFile (304). The application thread transfers to another Windows API, where it executes a system trap instruction (306).

The application thread then switches to kernel mode, so that it can execute in the trusted areas of the operating system normally off-limits from running applications. The trap handler sends the application thread to another NtReadFile in the kernel (332). At this stage, involvement of the Windows I/O Manager 320 for IO scheduling initiates. The IO scheduling that would normally be performed by the OS IO scheduling component is generally indicated by the dotted box 390 in FIG. 3. An initial aspect of this is that the app thread builds an I/O Request Packet (IRP), sets it up to target a disk object, and then carries it into the I/O Manager 320 (342).

In normal OS IO scheduling, by weaving in and out of the I/O Manager 320, the app thread carries the IRP down a series of layered drivers (e.g., 342, 344, 346, and so on). This "downward" progression continues until a bottom level driver (e.g., 346) determines that it is time to program an actual device 360 to get the data. The app thread executes driver code to program the device 360 (shown as downward arrow); for example, by interacting with a request queue exposed by the device in host shared memory. Notably, in a traditional arrangement, because storage responsiveness would be expected to be relatively long (e.g., millions of CPU cycles), the driver code sets up a callback and sends the app thread back up the stack of drivers to indicate a pending status. This theoretically would allow the operating system to reallocate the CPU to execute other application work, rather than busy-waiting until the storage operation completes.

In normal IO scheduling the app thread indicating "pending" would weave its way back up to the NtReadFile (332) of the kernel, where it either goes to sleep, or goes back into the application to do other work. Assuming that it goes to sleep, the application thread is removed from the CPU, and another thread is put on that CPU. At this point, the cached application thread state is lost from that CPU. This is part of what is referred to as context switch.

Continuing with the explanation of typical normal IO scheduling, it may be millions of CPU cycles later before the disk has completed the request. The disk device interrupts the system, which causes further shuffling as the operating system holds existing processing and sets up to handle the interrupt (348). In yet another context, the interrupt is handled and the operating system prepares to notify the original application thread that its request is complete. The interrupt handler schedules the callback to be prioritized and the interrupt is dismissed. The operating system would then execute the deferred procedure call, which gets the requested data arranged and calls back to the application thread (350).

At this point, the sleeping application thread is awakened by the operating system, and scheduled on a CPU (maybe the same one it was originally on, or maybe another one). The application thread finishes running back up the layers until it gets back to the next instruction after the original call to Win32 ReadFile. In other common operating systems, the flow of IO requests are much the same.

Thus, typical aspects of OS IO scheduling 390 introduce overhead. When each I/O request takes millions of CPU cycles, and CPU resources are scarce, this added overhead is not significant. But when I/O requests take orders of magnitude less time, and when multicore systems provide added parallel processing potential, the added scheduling overhead, contention for shared resources, and context switches become much more significant and detrimental to overall system performance. According to one aspect of this disclosure, the SV component with an APIO component intercepts any IO requests and largely circumvents the participation of the delay-inducing aspects of OS IO scheduling 390 entirely.

The above description illustrates how even in a single thread, the OS IO scheduling 390 introduces a bottleneck. In a parallel environment, the delays are multiplied. Moreover, the repeated involvement of OS IO scheduling 390 prevents the multicore system realizing its full parallel processing potential and productivity.

Figure 4:
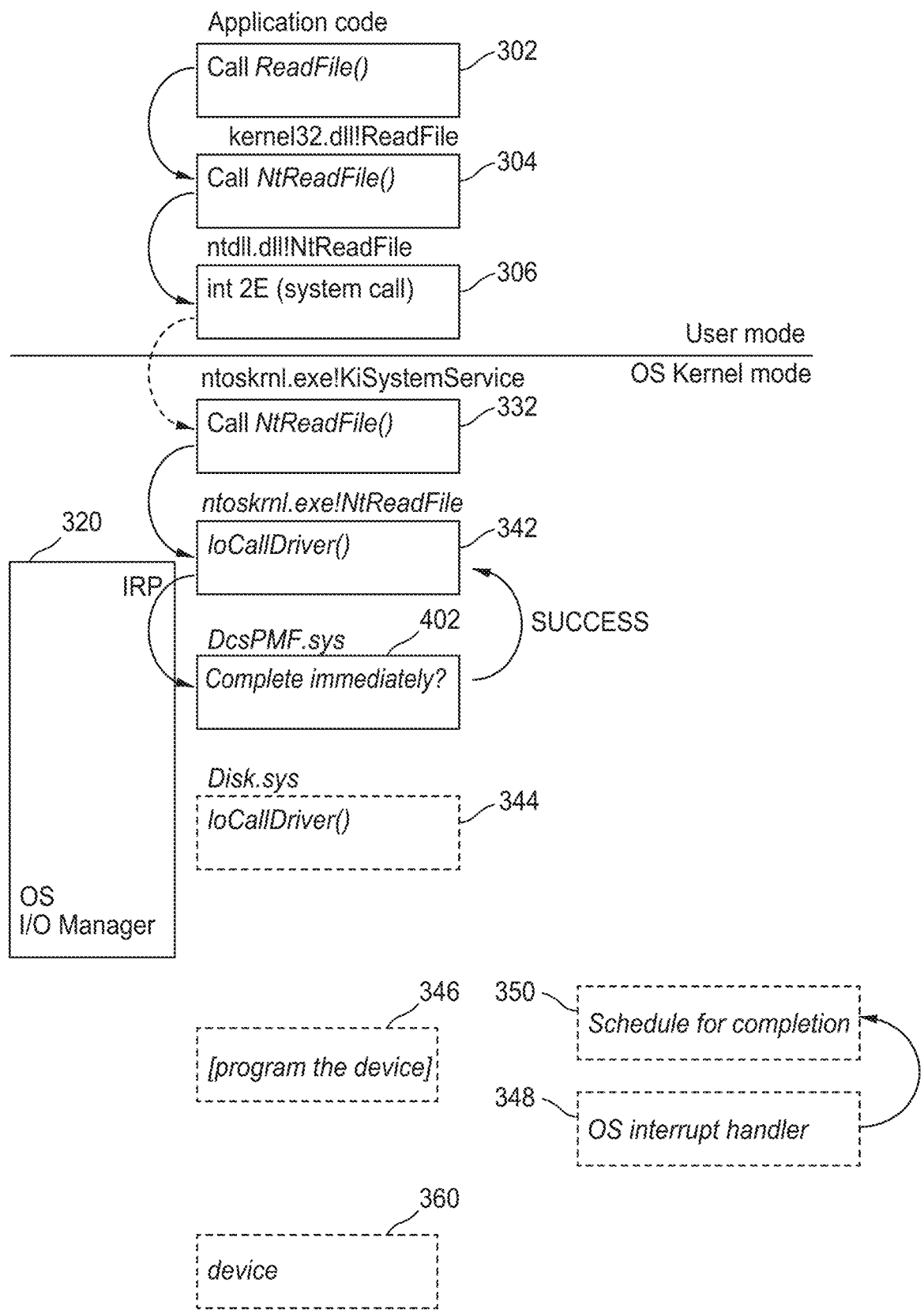
FIG. 4 is a block and flow diagram illustrating an example of storage virtualization with adaptive parallel IO in connection with an IO request subject to immediate processing.

FIG. 4 is a block and flow diagram illustrating an example of the operation of an SV component having an APIO component, in connection with a read operation (cache hit).

The APIO component processes IO requests in a highly parallel fashion, preserving local context as much as possible. In bypassing the OS IO sequencing component, the APIO component typically completes data requests in microseconds with very high probability, on the same CPU and in the same context as the application thread issuing the data request. FIG. 4 illustrates the integration of the component in a typical operating system environment, and how it helps realize the full parallel potential of a multicore server platform.

FIG. 4 illustrates a sequence of calls from an application to execute a read request against a virtual disk, under storage virtualization having an adaptive parallel IO component. An application initiates an IO request, here a read request (302). An application thread executing application code transfers to the Win32 API ReadFile (304). The application thread transfers to another Windows API, NtReadFile, where it executes a system trap instruction (306).

The application thread then switches to kernel mode, so that it can execute in the trusted areas of the operating system normally off-limits to running applications. The trap handler sends the application thread to another NtReadFile in the kernel (332). This initiates involvement of the Windows I/O Manager 320. In NtReadFile, the app thread builds an I/O Request Packet (IRP), sets it up to target a disk object, and then carries it into the I/O manager (342).

A portion of the APIO component that is registered with I/O Manager 320 as an upper filter driver is the first to see the IO request. It passes the request to the storage virtualization component for a determination whether it can be completed immediately (402). For example, with high probability, the requested data already resides in a high-speed cache, which is called a cache read hit (assumed present in FIG. 4). In this scenario, the SV component handles the IO request immediately. This takes place typically within microseconds of processing time. The filter driver then returns the requested data to the application immediately with "SUCCESS", synchronously, without invoking any of the underlying drivers; without waiting for, acquiring, and programming the device; without invoking any of the interrupt signaling or handling associated with the device completing a request. The original application thread context is preserved, the CPU cache state is preserved, and no other CPUs are disturbed. Contention for the device and contention associated with the device's interrupt is avoided altogether.

With the bypassing of the IO scheduling components of the OS, there is an immediate and substantial introduction of efficiency. Also, the efficiencies of avoiding contention among "upward" and "downward" bound storage-related threads are multiplied in a multicore environment. At the same time, it is useful for the storage virtualization component to be equipped for a parallel processing environment, so that the storage virtualization component does not itself introduce serialization on the IO request processing code path.

Figure 6:
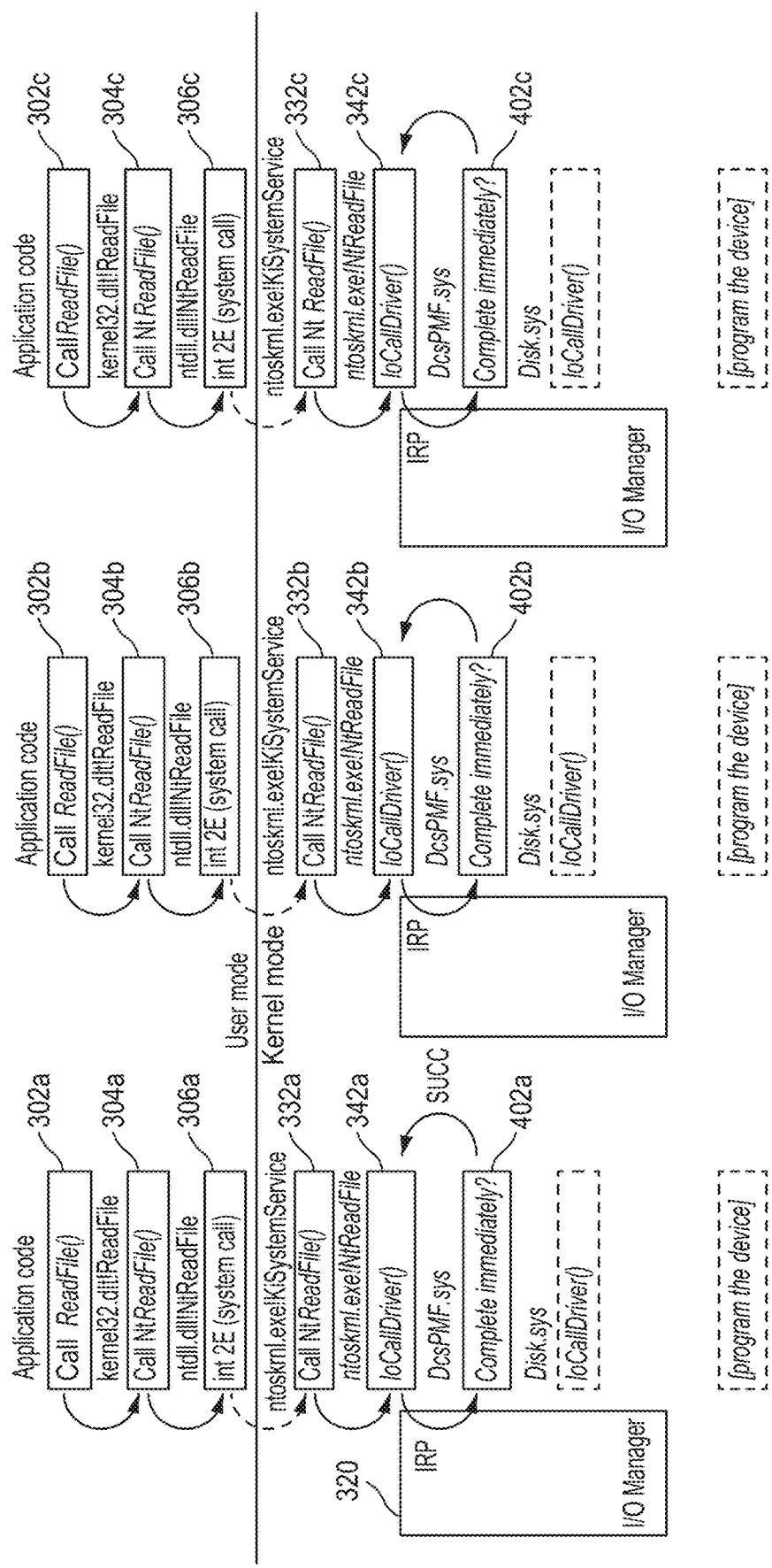
FIG. 6 is a block diagram illustrating storage virtualization with adaptive parallel IO in a parallel/multi-core environment.

FIG. 6 is a block diagram illustrating storage virtualization with adaptive parallel IO in a parallel/multicore environment.

The initiation of IO requests on application threads (302a-c), transfer to the OS (304a-c), execution of the system trap instruction (306a-c) and switchover to kernel mode (332a-c) all occur in parallel. Although three parallel instances are shown, there can be many more parallel threads in a typical multicore environment.

When multiple application threads are issuing requests simultaneously, the filter driver (342a-c) and storage virtualization component cooperate to keep each thread's request local to the CPU on which it is running. With high probability, the request is completed immediately (e.g., 402a-c) in the application context. Contention for shared objects is eliminated, and CPU state and pipeline throughput is preserved. The result is a highly parallel execution model, taking full advantage of the multicore processing platform's potential.

Figure 5:
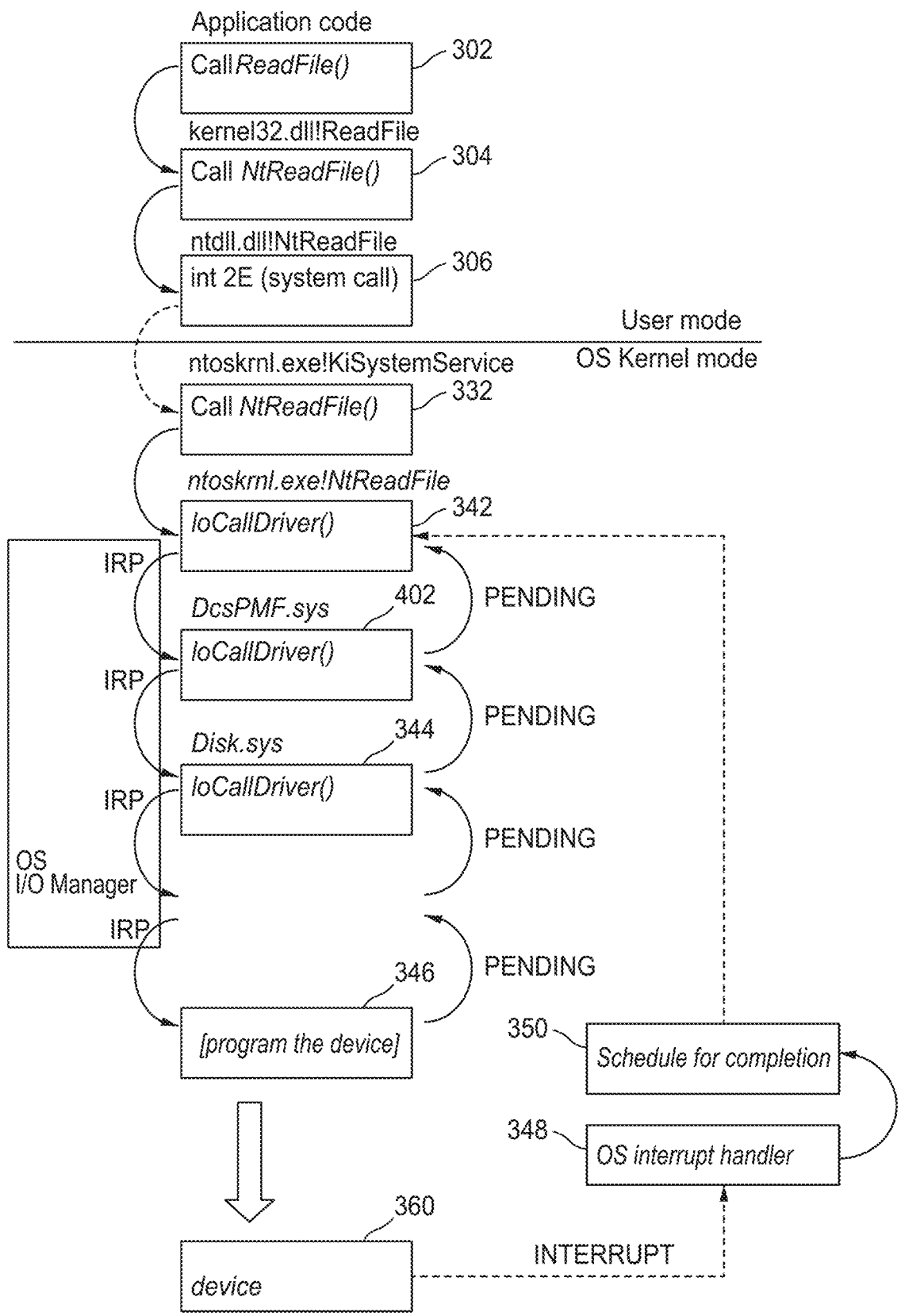
FIG. 5 is a block and flow diagram illustrating an example of storage virtualization with adaptive parallel IO in connection with an IO request not subject to immediate processing.

FIG. 5 is a block and flow diagram illustrating an example of storage virtualization with adaptive parallel IO in connection with another read operation (cache miss). The various modules in FIG. 5 correspond to those described for FIGS. 3-4 and need not be repeated. The notable aspects of the cache miss situation are that when the filter driver and storage virtualization component cannot satisfy the read request, then it will involve the existing OS I/O processing code path. This "re-introduces" the same delays that would be encountered in a conventional approach, but the cache miss situation is relatively rare. Moreover, when the storage virtualization component ultimately satisfies the read request, it brings the data thus read into its high-speed cache, so that a subsequent read request for that data will hit in cache.

Figure 7:
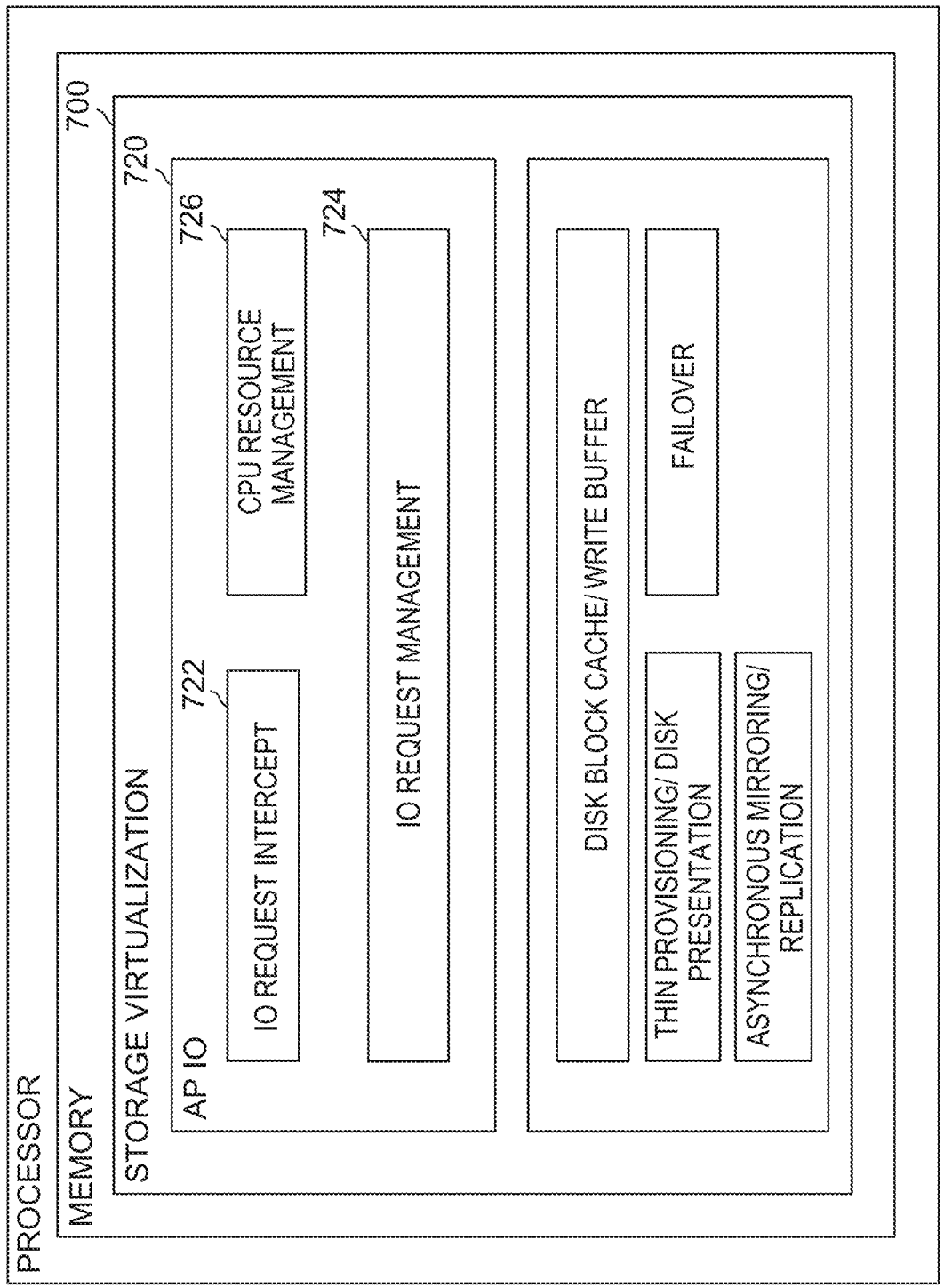
FIG. 7 is a block diagram illustrating an example of storage virtualization with an adaptive parallel IO component.

FIG. 7 is a block diagram illustrating an example of an SV component 700 including an APIO component 720.

The SV component 700 includes a variety of components that are available in storage virtualization including thin provisioning/disk presentation, asynchronous mirroring, failover/failback and asynchronous replication. The SV component 700 also preferably includes a disk block cache. This is a block level cache, which the stores data associated with virtual disks presented by the SV component 700, and is ideally provided in high speed memory for immediate access in response to IO requests. The disk block cache is updated based upon criteria including how recently the data for a given block has been read. When the SV component 700 receives a read request, it can either direct the read request from the cache (cache hit), or organize retrieval of the data when it's not resident in the cache (cache miss). The SV component 700 also handles write requests and preferably includes buffering so the incoming writes can be queued and thus immediately indicated as successfully received (e.g., in response to an incoming application thread with a write request). Various schemes may be used to maintain data coherency in organizing the queuing of writes and their ultimate resolution into the disk block cache and/or external storage resources.

The APIO component 720 includes an IO request intercept component 722, an IO request management component 724, and a CPU resource management component 726.

The IO request intercept component 722 includes the upper filter driver that intercepts the IO requests before they progress through the above-described typical OS IO sequencing events.

The IO request management component 724 is in communication with the IO request intercept component 722. It determines whether a corresponding IO request is immediately serviceable by the SV component 700. In one example, a read request that results in a cache hit is an example of an immediately serviceable IO request. This may be performed through inquiry to the SV component 700 with respect to the state of the disk block cache. A write request is another example of an immediately serviceable IO request. This, however, may be subject to the current capacity of the disk block cache, and where applicable its corresponding write buffer. With respect to this, the disk block cache of the SV component 700 is configured to immediately indicate whether it can currently accept the write request. The IO request management component 724 receives the indication and processes the IO request accordingly, with "success" corresponding to the ability to immediately satisfy the IO request so as to omit normal OS IO scheduling.

The reads or writes that are immediately serviceable are handled as such, and the APIO component 720 passes the success of the IO request back up to the application immediately and without context switching. When the IO request is not immediately serviceable, the APIO component 720 provides instructions to pass the thread with the IO request back for regular IO scheduling.

The CPU resource management component 726 allows adaptive usage of multi-core processing platform (e.g., more CPUs). Traditional IO scheduling doesn't make use of spare CPU resources on demand. By contrast, the APIO 720 effectively invokes available CPU resources (i.e., available additional CPUs of the multicore platform on which it operates). But the ability to adaptively invoke available CPUs creates a tension between CPU resources to be used for application workload and those used for IO demand.

The CPU resource management component 726 is configured to make determinations as to whether IO requests can directly proceed (without invoking normal OS IO scheduling) using potentially available CPU resources. In one example, the determination is based upon a designated maximum number of CPUs that can be dedicated to IO demand. Thus, if an IO request arrives and there are remaining, available CPUs, and the maximum number is not reached, the CPU resource management component 726 informs the IO request management component 724 that the IO request is serviceable. This results in an indication of "success" for the IO request that is communicated back to the application as described.

It is important to note that in one embodiment, the indication that an IO request can be successfully handled can be made regardless of the state of the disk block cache. That is, even on a cache miss, or a situation where write buffer capacity is reached, the CPU resource management component 726 can inquire and inform as to currently available CPU resources for immediately processing the IO request. In this fashion, available CPU resources are used to pick up and satisfy the IO request as expeditiously as possible, instead of passing the IO request back up the chain for normal OS IO scheduling.

The CPU resource management component 726 may also use alternative or additional criteria to determination whether CPU resources can be used to handle IO requests. The CPU resource management component 726 is preferably configured to dynamically balance the availability of CPU resources between application demand and IO demand. It is configured to track instantaneous and historical IO and application processing loads, and to use that information to determine whether an available CPU resource may be allocated to an IO request. For example, historical information may show that the demand for application processing demand increases during a particular time period (e.g., 10 AM-2 PM). It may also show that demand for IO request processing increases during another particular time period (e.g., 8 AM-10 AM and/or 4 PM-6 PM). Either or both of these denoted time periods may be used to determine CPU resource allocation. In one embodiment, this information may be used to adjust the setting of the designated maximum number of CPUs that can be dedicated to IO demand. Thus, during the time period(s) where application processing is historically heavy, the threshold value (setting) for the maximum number of CPUs useable for IO demand decreases, whereas during th time period(s) where IO request processing is historically heavy, the threshold value increases. Still further, instantaneous demand levels are analyzed to further modify the decision making process. This can be embodied as additional adjustments to the maximum number of CPUs available for IO demand depending upon ongoing needs (IO v. applications) in real time.

In one example, the CPU resource management component 726 is also configured to apply Quality of Service (QOS) criteria to determinations whether IO requests can be immediately processed. For example, IO requests originating from a first set of applications may be given priority over those of other applications based upon a QOS guarantee provided to the first set of applications. For example, the QOS can be delineated among levels (e.g., levels 1-3) with a given first level being designated for highest priority, and so on. In one example, the threshold values for the number of CPUs available for IO request processing differs among the respective levels (e.g., level 3 maximum 20% of CPU resources, level 2 at 35% and level 1 at 50%). Moreover, these levels are configurable to similarly adjust depending upon historical and instantaneous demand levels, as described above.

In one embodiment, the CPU resource management component 726 is configured to apply all of the above described criteria to carry out determinations whether IO requests can be immediately processed using CPU resources on the multicore platform. This is preferably carried out using a set of rules or heuristics corresponding to the number of CPU resources and corresponding default thresholds, QOS criteria, and historical and instantaneous load values. Moreover, the settings for the determinations are configurable to accommodate customized allocation of CPU resources.

The SV component 700 including the APIO component 720 may be provided as software, such as resident in memory for execution by a processing unit as part of a processing system. It may also be provided as stored on a non-transitory computer readable medium (e.g., a disk) for downloading, uploading, selling, distributing, etc. of the SV component 700 with the APIO component 720.

Figure 8:
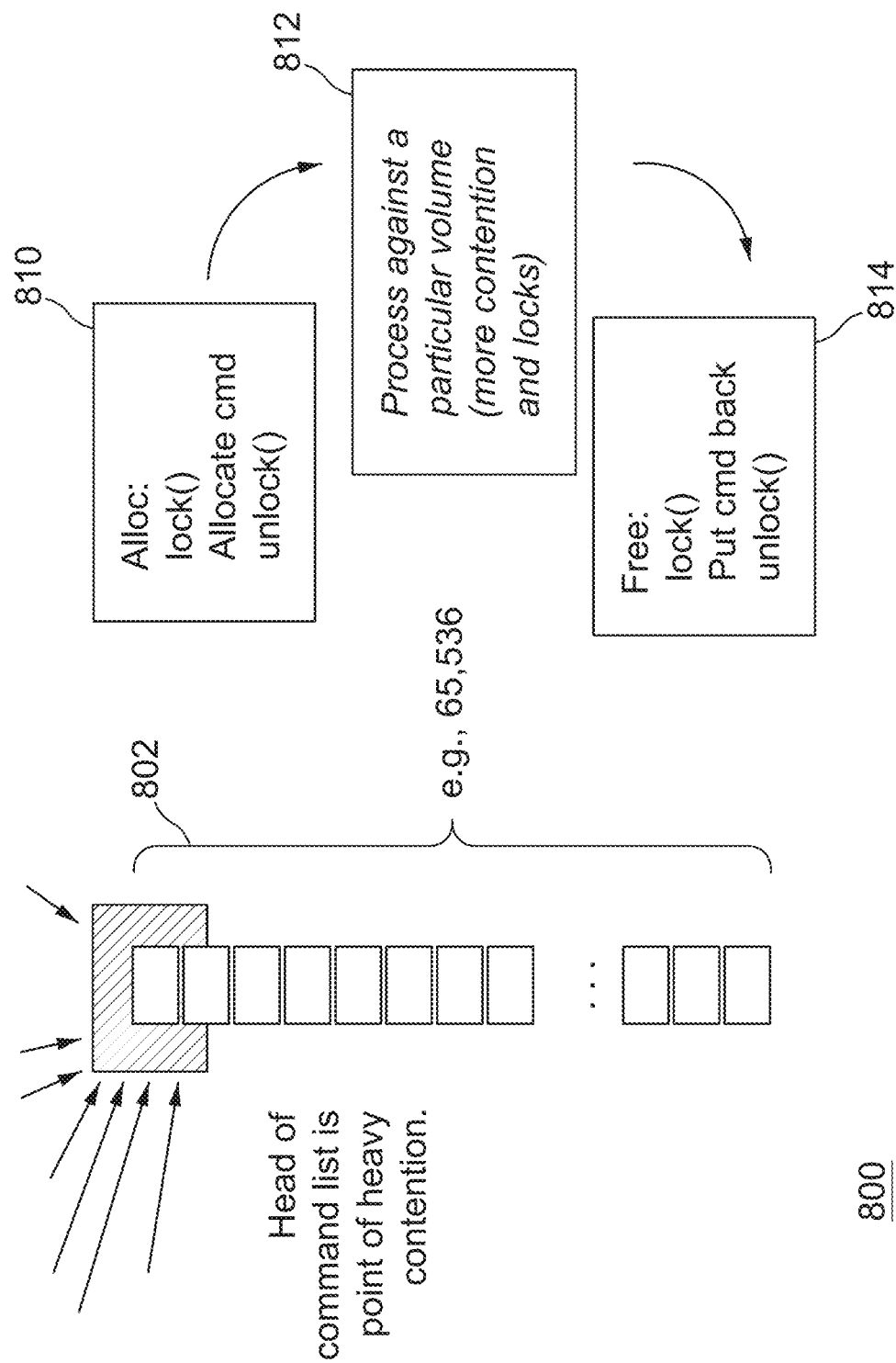
FIG. 8 is a schematic diagram illustrating contention in allocating and freeing commands associated with IO request handling.

FIG. 8 is a schematic diagram 800 illustrating contention in allocating and freeing commands associated with IO request handling.

As described above, a significant amount of IO Request processing delays are avoided in a multi-core environment in bypassing aspects of OS IO scheduling, where the opportunity to do so avails itself. When IO Requests progress through bypass processing, there are additional requirements and potential bottlenecks in carrying out the IO Request at lower levels, such as at the cache level.

For example, the cache of the storage virtualization components is typically configured to accept requests from client programs to read or write data against one or more logical random-access storage devices, which in the virtualization context are virtual volumes. The devices appear to the operating system as regular logical storage devices that can be addressed by block, for reads or writes. The cache of the storage virtualization component must manage the processing of these IO requests through software abstractions that represent the IO request making its way through the various stages of processing. In one embodiment, a cache may represent this using an abstraction called a storage command, or simply a command.

A command may be referred to as a representation of work in progress for an IO Request (e.g., a read or a write) that targets a device, offset and length. For example, a basic sequence for a read request may be characterized as:

(1) Build a command targeting the device, offset, and length;
(2) Issue the command;
(3) Copy data out using the command; and
(4) Free the command.

Similarly, for write requests, this may be characterized as:
(1) Build a command targeting the device, offset, and length;
(2) Request the command to allocate space into which the data to be written is copied;
(3) Issue the command; and
(4) Free the command.

It should be understood that the command is not in itself an executable that carries out these processes. It is, rather, the representation and placeholder for the work to be done in carrying out the IO Request. The commands must be allocated and freed in a fashion that allows threads to coherently make IO Requests and receive responses (e.g., pending, callback, success) when they occur.

Referring to FIG. 8, a traditional free command list may list the available ("free") commands in a single doubly linked list 802. When a thread allocates a command to represent an application data read/write request, it is allocated 810 from this list. This involves locking the list, popping a command from the free command list, and then unlocking the list. In a multi-core environment, the head of the free command list 802 becomes a point of heavy contention as multiple threads on respective CPUs seek access to the list, creating a "lock convoy" of threads waiting to pass through the critical section guarding the list head. There is also the need for processing 812 of the IO Request against a particular volume. Each volume has at least some form of associated list that is periodically locked to link and unlink each command against the volume. This may be referred to as a device lock (even for a virtual volume). This also is a point of contention in a multi-core environment, where many threads are seeking access to the same volume. There is various work performed, including "backend" cache work in relation to processing 812 the IO requests, also potentially involving device locks. Finally, once the work associated with the command is completed, a free 814 process pushes it onto the free command list 802, and this again involves locking the free command list, increasing contention.

Figure 9:
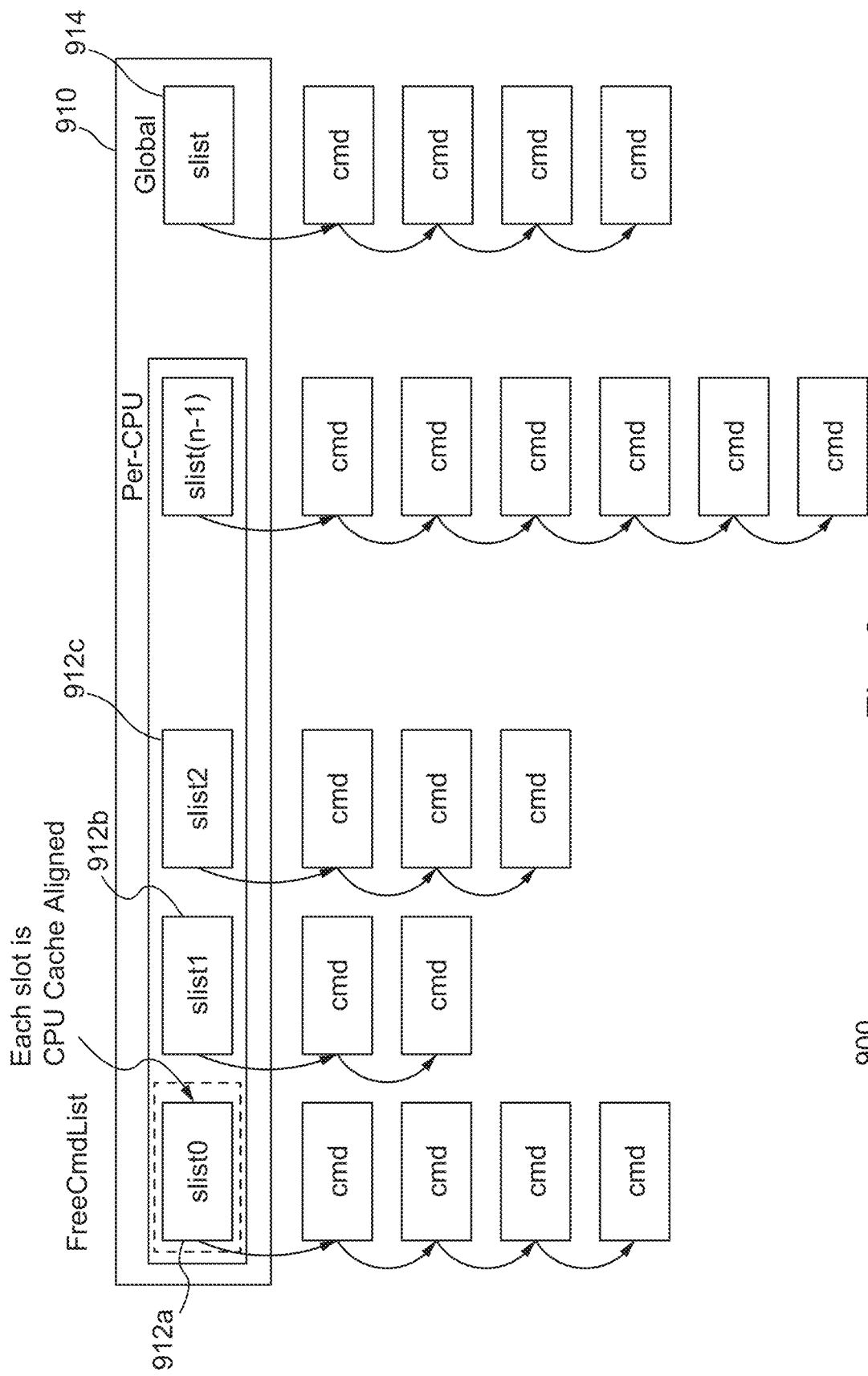
FIG. 9 is a schematic diagram illustrating an example of a parallel per-CPU free command list configuration.
Figure 10:
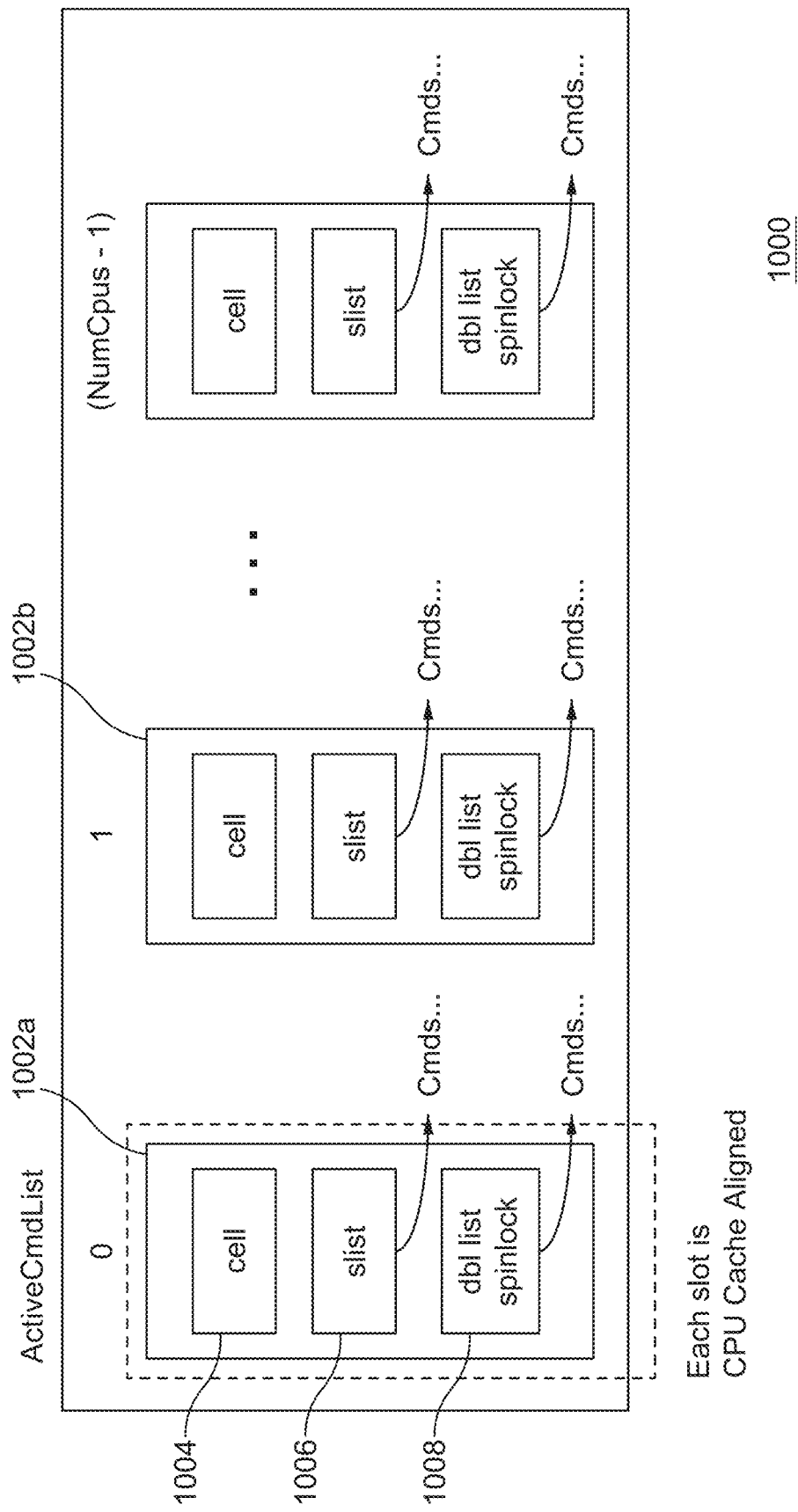
FIG. 10 is a schematic diagram illustrating an example of a parallel per-CPU active command list configuration.
Figure 11:
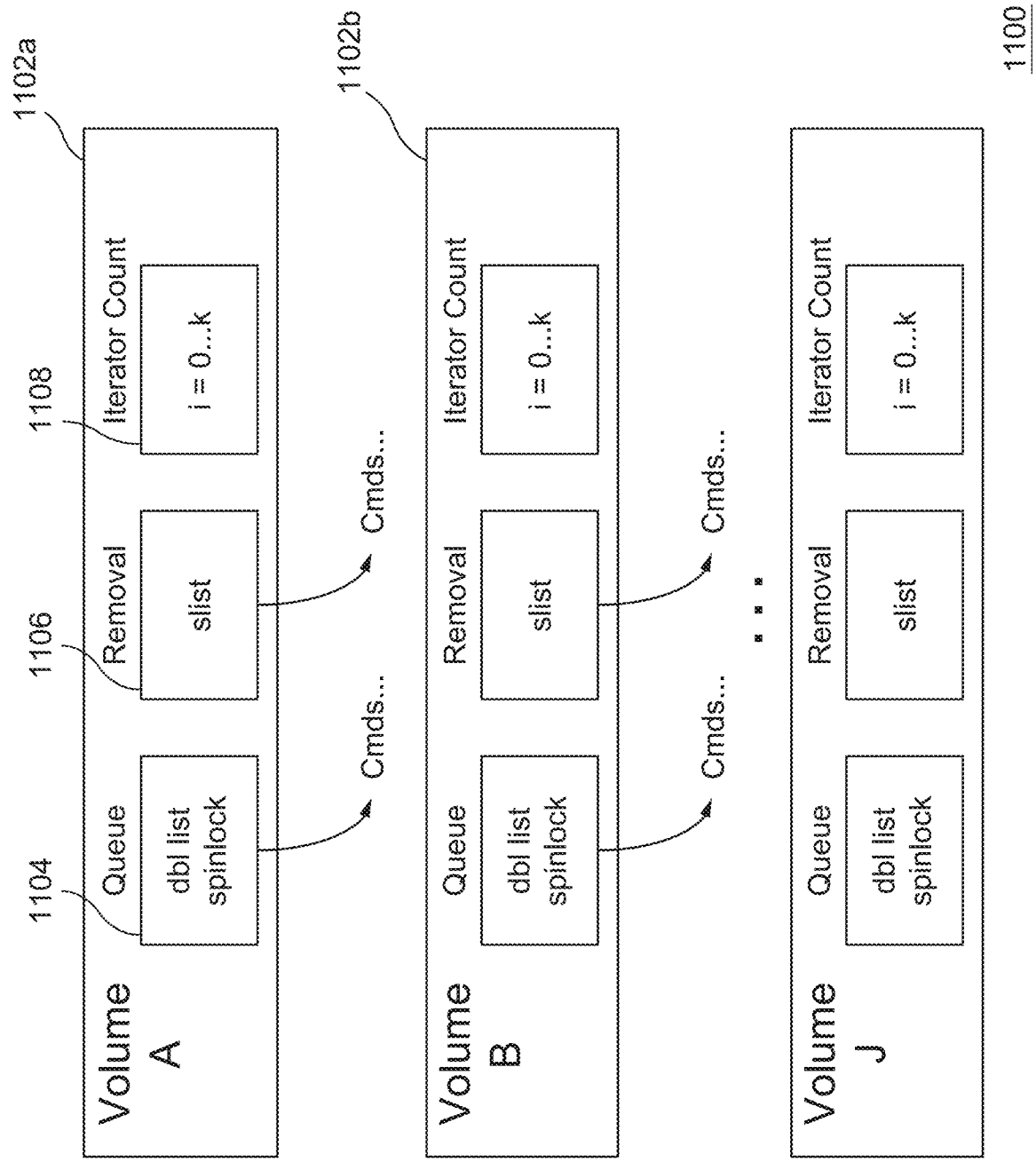
FIG. 11 is a schematic diagram illustrating an example of a per-volume backend queue configuration.

One example of APIO in accordance with this disclosure implements data structures including a per-CPU free command list configuration, a per-CPU active command list configuration and a per-volume backend queue configuration, as introduced in FIGS. 9-11. This arrangement is evidently more complex than the simple command list 802 and per-volume structures 812 of FIG. 8. Thus, one might expect less efficiency. However, as described below, these arrangements and corresponding processes significantly increase parallel IO Request handling capacity in a multi-core environment, and significantly increase overall efficiency in processing IO Requests in a multi-core environment. Part of the reasoning for this is that the system is arranged to increase parallelism, and while it introduces some complexity, it provides clear avenues for straightforward IO Requests to be processed and cleared within a few short cycles, without context switching. Moreover, even for those IO Requests that do require some additional handling, mechanisms are provided to allow work to progress without causing lock convoys or the like that can greatly hinder other work from being performed, introducing latency, lengthening application response time.

FIG. 9 is a schematic diagram illustrating an example of a per-CPU free command list structure 900. It includes several per-CPU command lists 912a-c and a global command list 914. Preferably, the number of per-CPU command lists corresponds to the number of CPUs that could potentially host threads with IO Requests (e.g., "N"). Each per-CPU command list is configured as a so-called "lock-free" singly linked list (or "slist"). This provides a lock free data structure with atomic variables. By contrast, the single command list structure 802 of FIG. 8 provides a single doubly linked list guarded with a spinlock. With that structure, the list is locked whenever any thread seeks allocation of a command, or whenever a command is freed to the list upon completion. The parallel, lock-free, per-CPU command slists support only straightforward pop and push operations to allocate and free commands to the respective lists. The per-CPU command list structure is configured to allocate commands to the per-CPU list corresponding to the CPU on which a thread is executing. At times, the list of free commands in a given per-CPU list may be exhausted. Thus, the structure 900 also provides the global command list 914 from which commands can be allocated. The global command list 914 essentially provides a remaining number of available commands over the cumulative number of available commands in the per-CPU command lists. The global command list 914 is also preferably configured as a lock-free, atomic slist, having less overhead than a doubly-linked list guarded with a spinlock.

In addition to providing a configuration that allows allocation to numerous CPUs without creating a lock convoy, each slot in the per-CPU command list structure 900 is configured to be CPU cache aligned. This prevents multiple CPUs from attempting to access variables that are in the same (e.g., 64 byte) cache line, which would introduce inadvertent contention ("cache line ping pong") despite the presence of separate per-CPU cache lists.

FIG. 10 is a schematic diagram illustrating an example of a per-CPU active command list structure 1000. The per-CPU active command list structure 1000 includes several per-CPU active command list structures (e.g., 1002a-b). In this example, the number of these structures 1002a-b matches the number of CPUs ("N"). Additionally, each of the slots for the structures 1002a-b is CPU cache aligned.

The per-CPU active command list structure 1000 may be considered as a first stop for command processing. If a command can be completed very quickly, then it need never go further than the active command list. The per-CPU active command list structure 1000 uses high-performance platform primitives ('interlocked compare exchange'), high-performance "lock free" slists, and an array of per-CPU data structures and algorithms to handle first-stage command queueing. It is designed to increase CPU locality and minimize costly locking operations, so to produce maximum parallel throughput.

Specifically, each of the per-CPU active command list structures 1002a-b respectively includes a cell 1004, slist 1006 and doubly linked list 1008 component. Linking and unlinking are described further below, but generally the interlocked compare exchange is used in connection with the cell when the cell is available to link the command. When that is not the case, the lock-free atomic slist is used. And finally the spinlocked, doubly-linked list is used, but only when necessary.

FIG. 11 is a schematic diagram illustrating an example of a per-volume backend queue structure 1100. One of the issues with a naively implemented doubly linked list with a spinlock is that worker threads that are completing tasks at the back end of the cache in relation to IO Requests are locking the list as they iterate through it, even while other threads are trying to link additional commands to the list for processing. This means that the list is constantly being hit from the top (allocation) and the bottom (free) and is locking for all accessors. The creation of a separate structure 1100 with special consideration for "iterators" at the backend allows lock hold time to be minimized, thus helping to minimize contention in processing IO requests against these virtual volumes.

The per-volume backend queue structure 1100 includes several per-volume backend queues 1102a-b, preferably one for each of "X" volumes presented by the storage virtualization component. Each of the queues 1102a-b includes a doubly linked list 1104 and a removal list 1106. The doubly linked list 1104 is the primary listing for commands that have been allocated down to the volume. As noted above, some commands (e.g., on cache hit) are resolved at the active command list stage and thus do not need to progress to the backend queue. Those that do not get immediately resolved (e.g., cache miss) are listed in the doubly linked list 1104. Various worker threads operate on these doubly-linked lists 1104 to complete IO Requests at the backend, for example, finding, retrieving and placing data in the cache following a cache miss. These and other threads that need to process the backend queues are referred to as iterators. At any given point in time, several iterators may be processing a particular backend queue, even while additional application or poller threads are attempting to add commands to these backend queues for additional processing. Coordination among all these threads is required, but if a worker thread processing a backend queue holds a spinlock for the entire time it spends iterating through the list, that will cause significant contention for that list's spinlock. A mechanism is therefore provided to minimize the time the spinlock is held. A variable (e.g., Iterator_Count) is used to track the number of iterators currently "in" a given per-volume backend queue 1102*a-b*. The structure 1100 is configured to allow many threads to interact with a given backend queue simultaneously, without any of them having to hold the queue's spinlock for an extended period of time; for example, holding the spinlock while iterating through the entire set of commands in the doubly linked list 1104, possibly numbering in the hundreds. Instead, especially when there are iterators actively walking through the queue, the completed commands may simply be placed in the removal list 1106 (an slist), which does not require the entire list to be spinlocked. When later conditions make it easier to process the removals without contention (e.g., when no iterators are left), the commands in the removal list 1106 can be processed against the doubly linked list 1104, thus the commands in need of removal can be finally removed/unlinked from the backend queue.

Figure 12A:
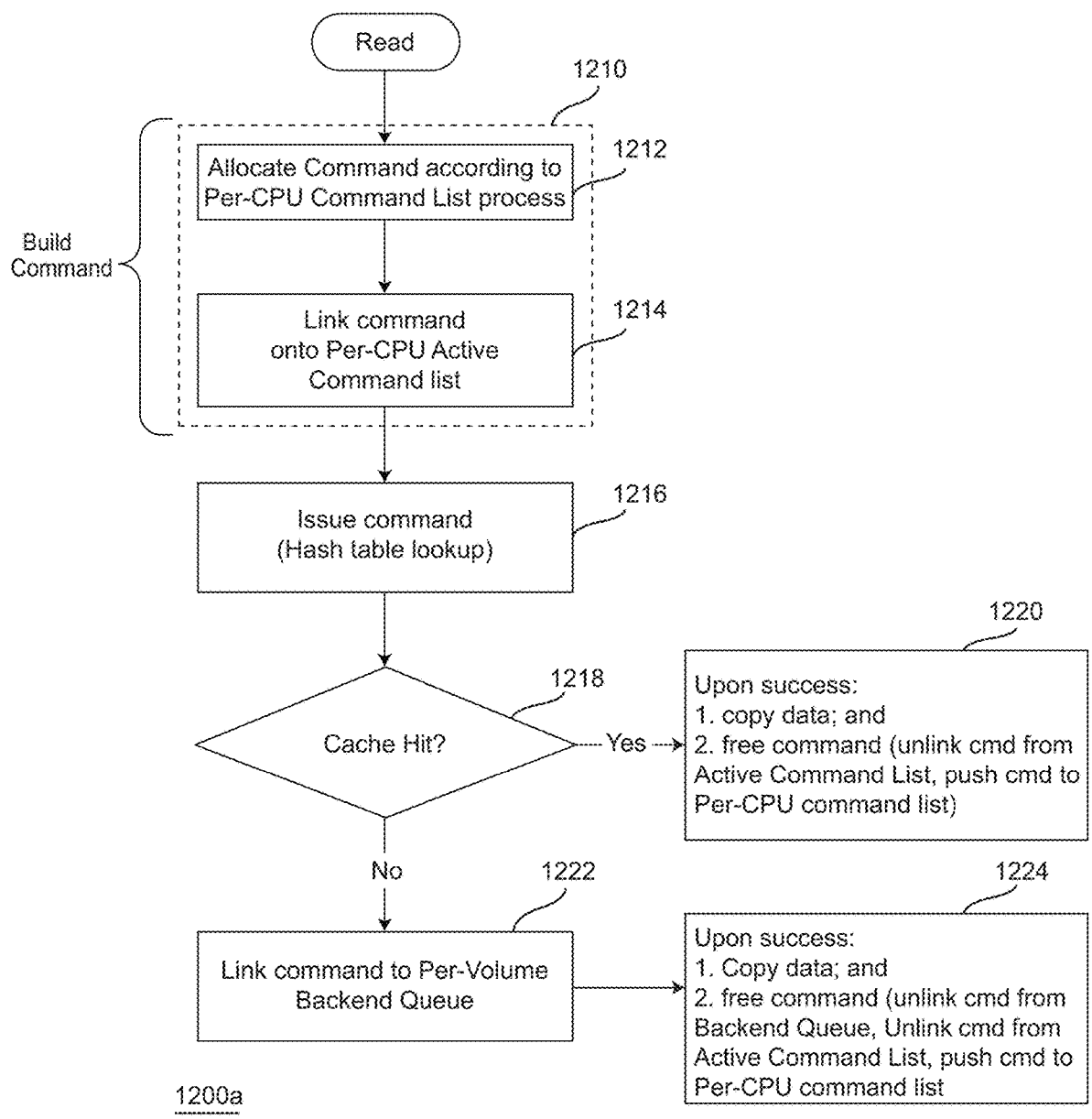
FIG. 12A is a flow diagram illustrating an example of a read process implementing the command list configurations of FIGS. 9-11.
Figure 12B:
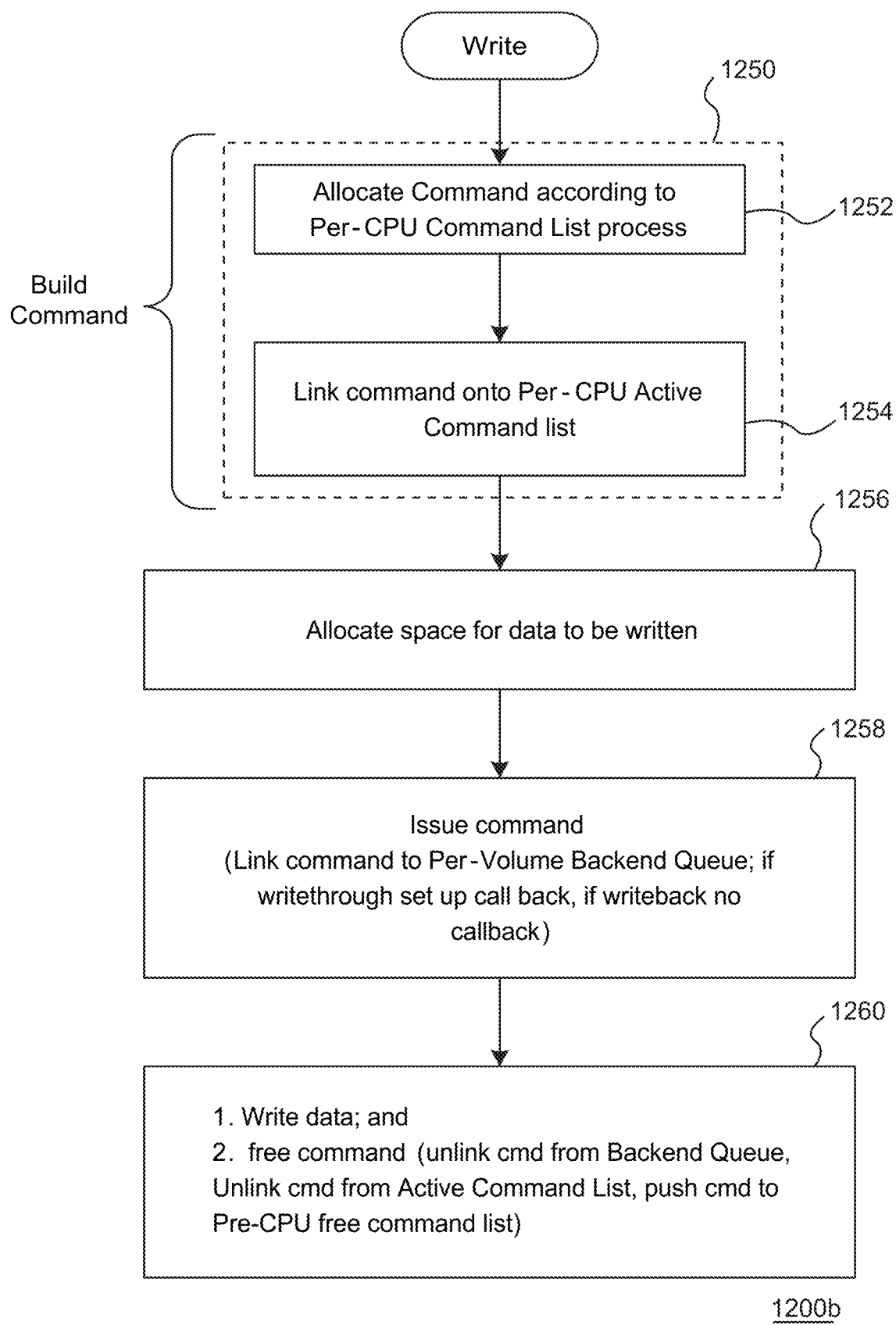
FIG. 12B is a flow diagram illustrating an example of a write process implementing the command list configurations of FIGS. 9-11.
Figure 12C:
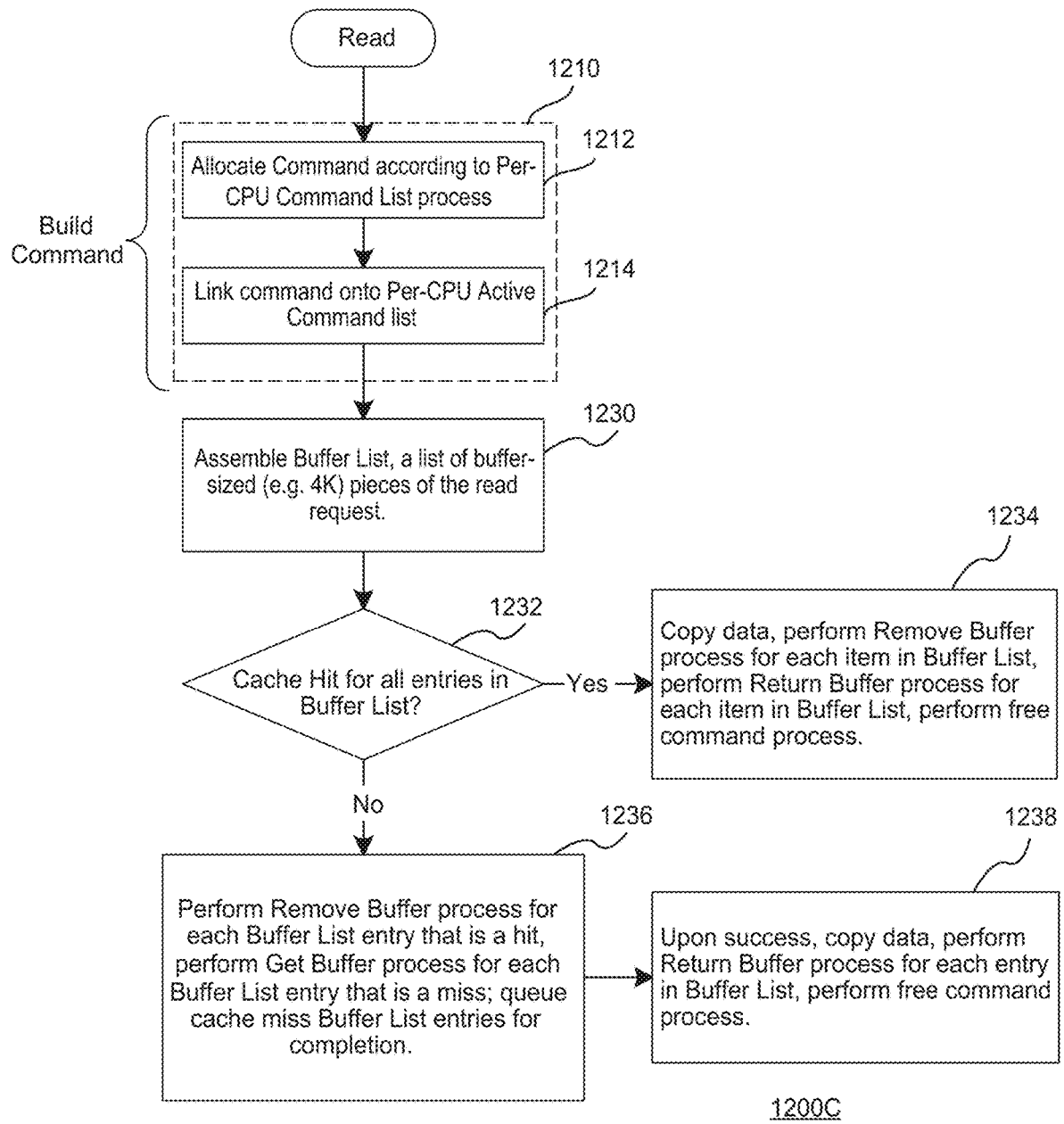
FIG. 12C is a flow diagram illustrating an example of a read process implementing LRU buffer management.
Figure 12D:
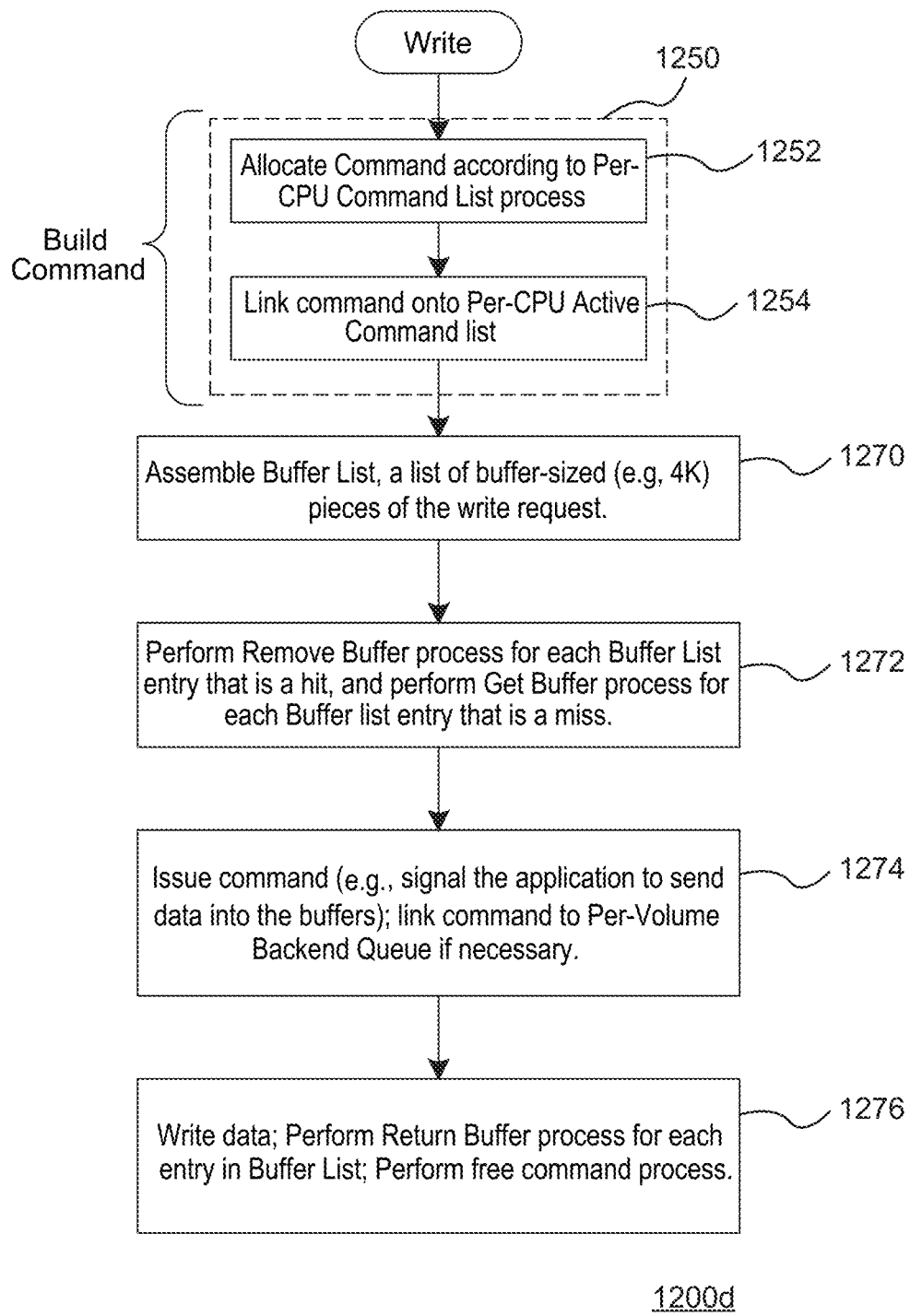
FIG. 12D is a flow diagram illustrating an example of a write process implementing LRU buffer management.
Figure 13:
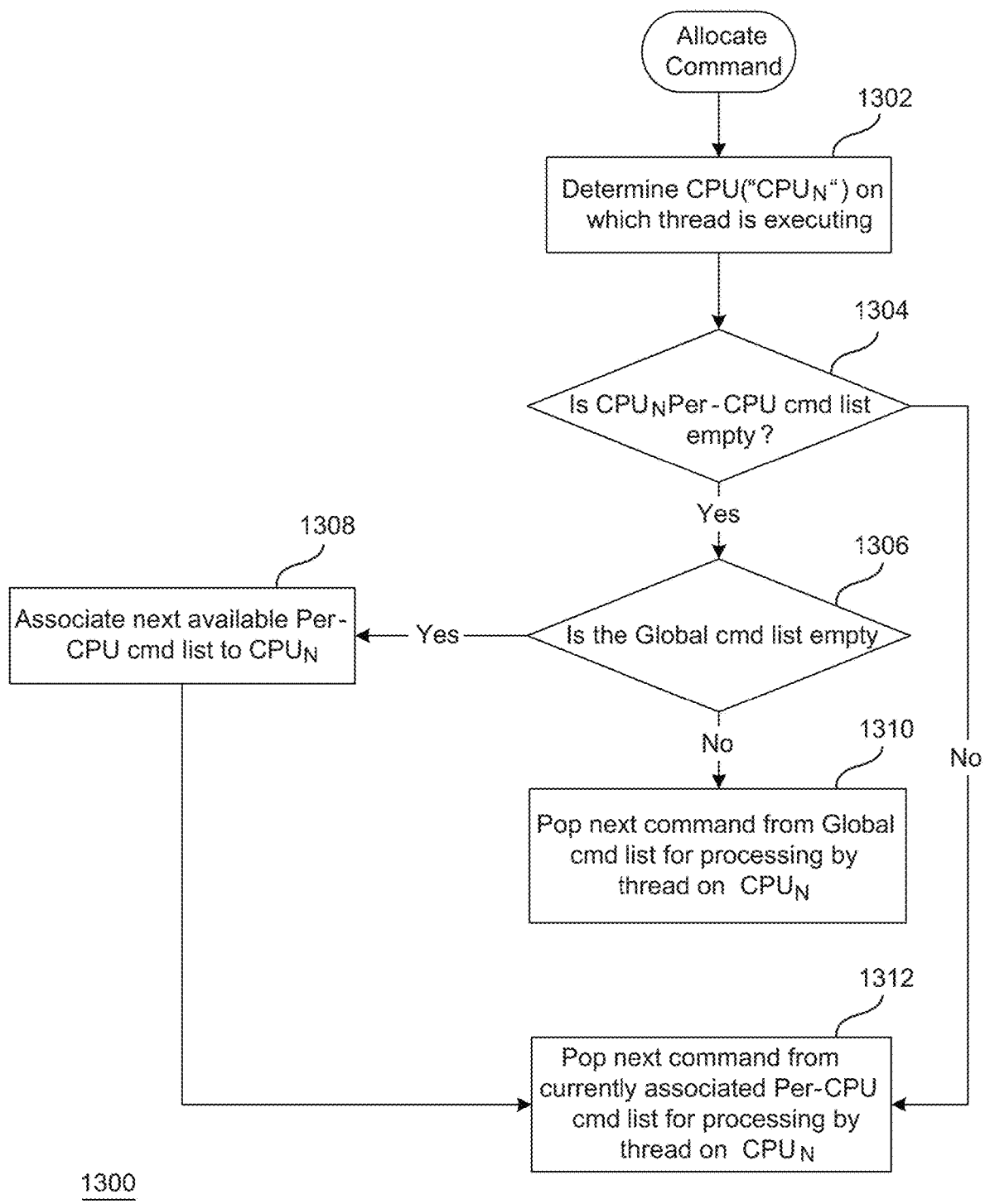
FIG. 13 is a flow diagram illustrating an example of allocating a command according to a per-CPU command list process.
Figure 14:
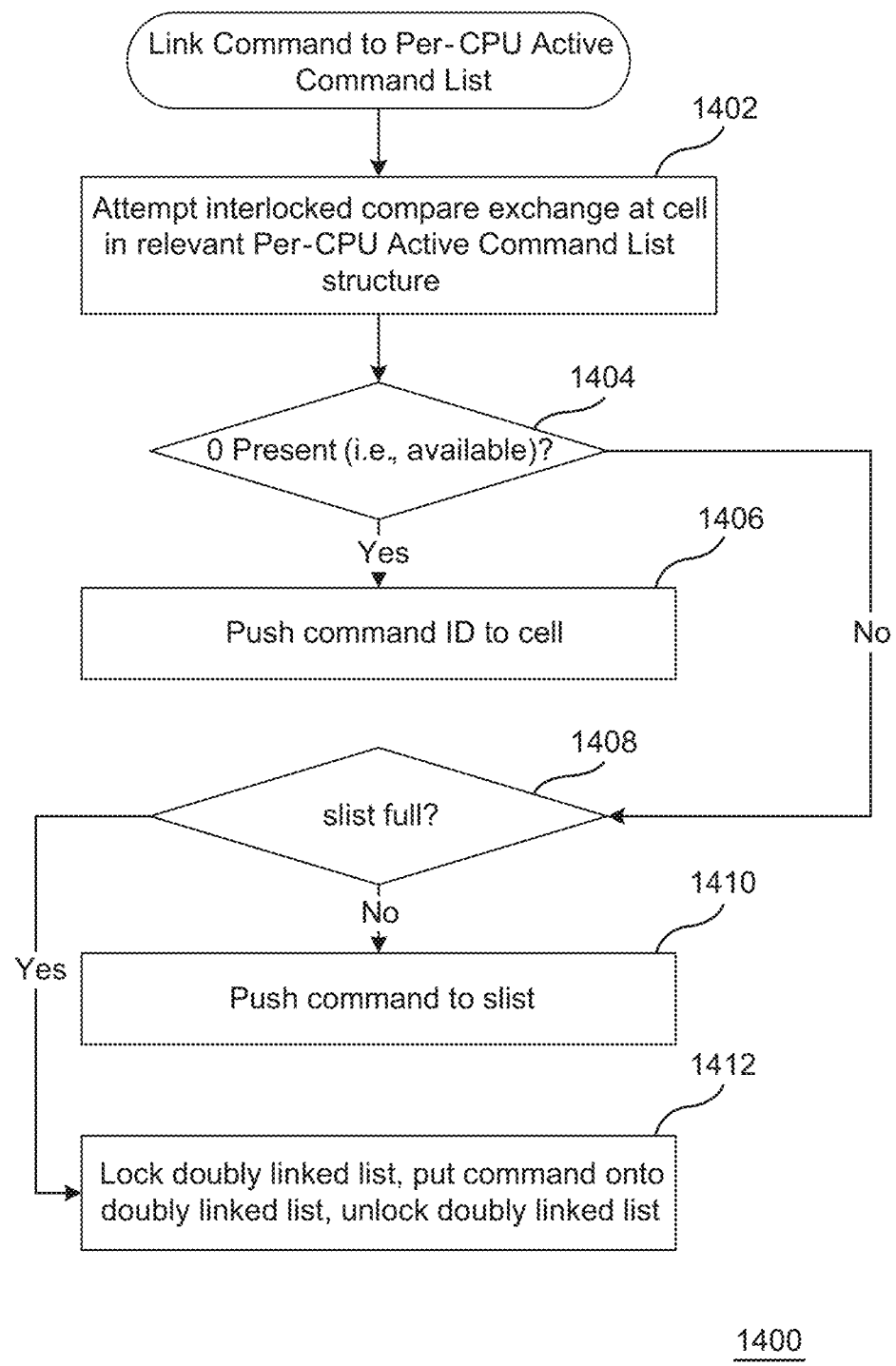
FIG. 14 is a flow diagram illustrating an example of linking a command to a per-CPU active command list.
Figure 15:
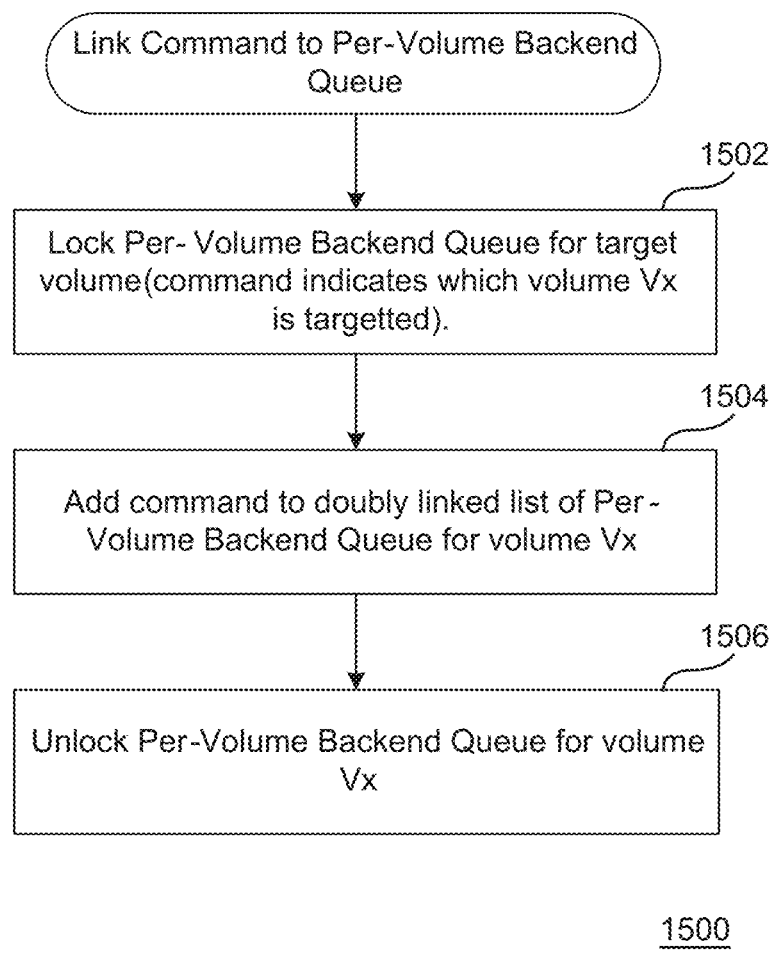
FIG. 15 is a flow diagram illustrating an example of linking a command to a per-volume backend queue.
Figure 16A:
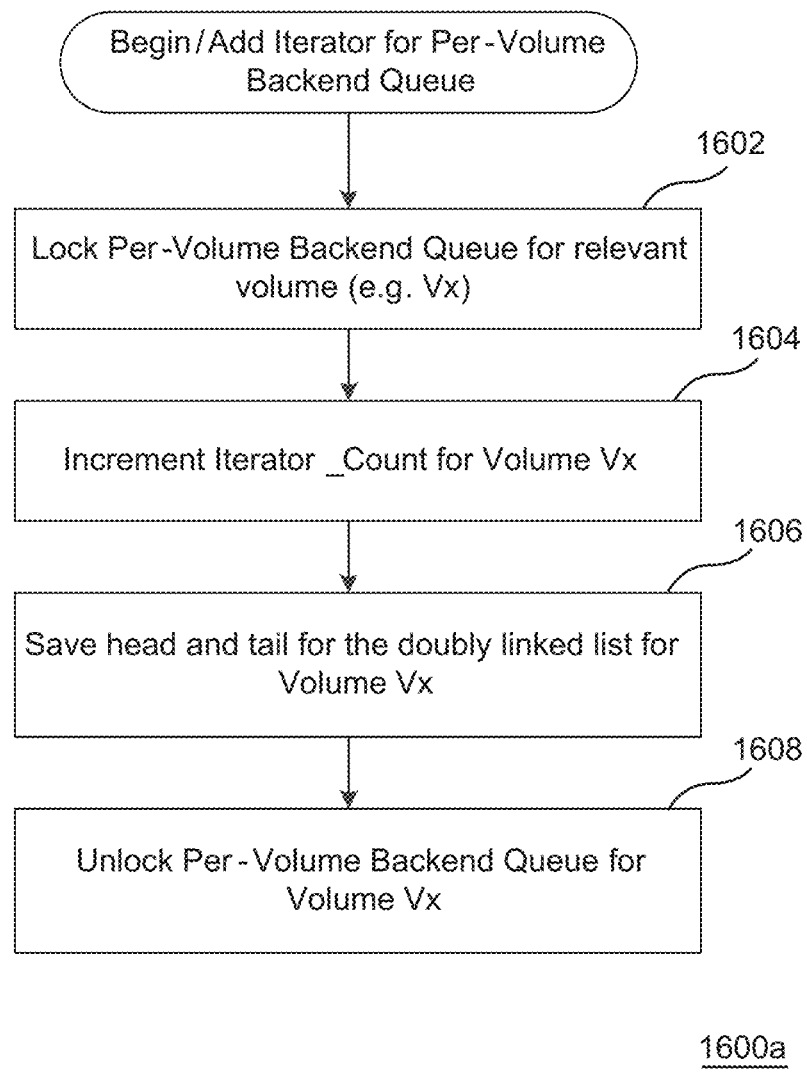
FIGS. 16A-B are flow diagrams illustrating iterator begin and end processes in association with a per-volume backend queue.
Figure 16B:
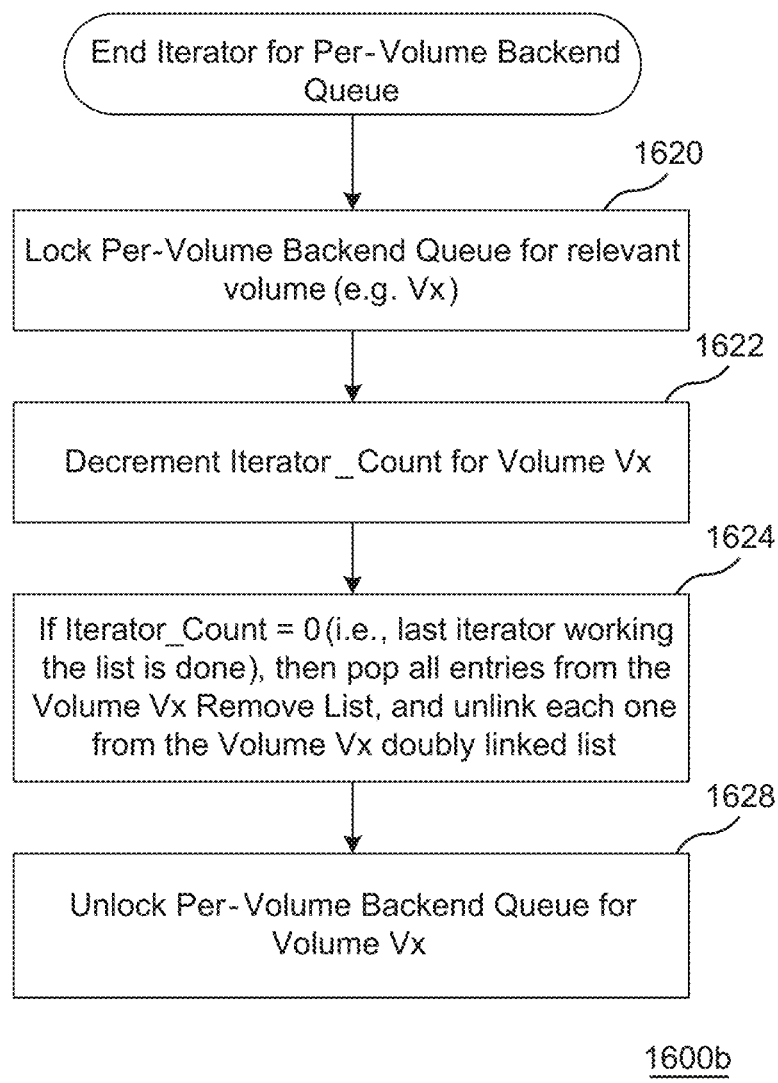
Figure 17:
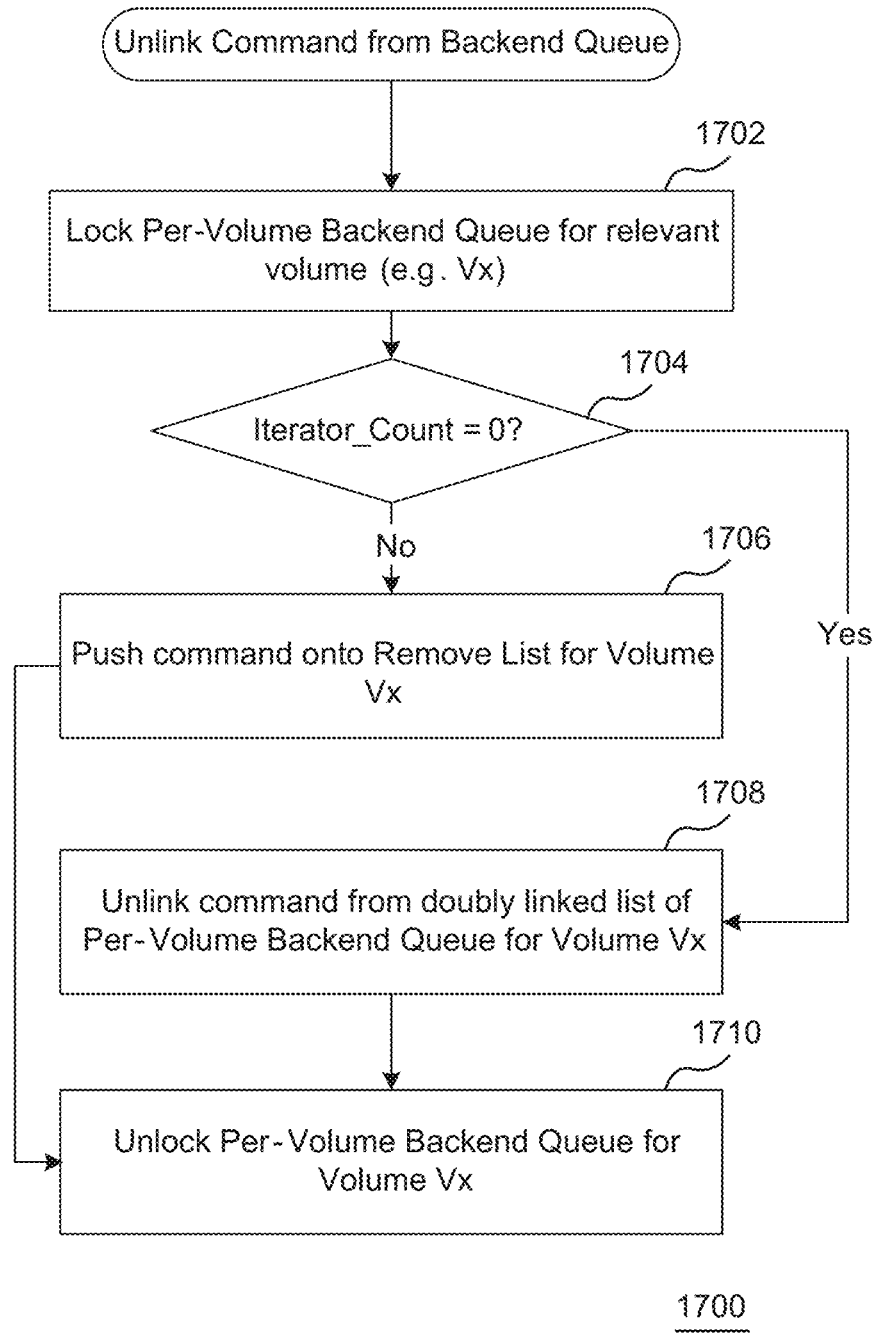
FIG. 17 is a flow diagram illustrating an example of unlinking a command from a per-volume backend queue.
Figure 18:
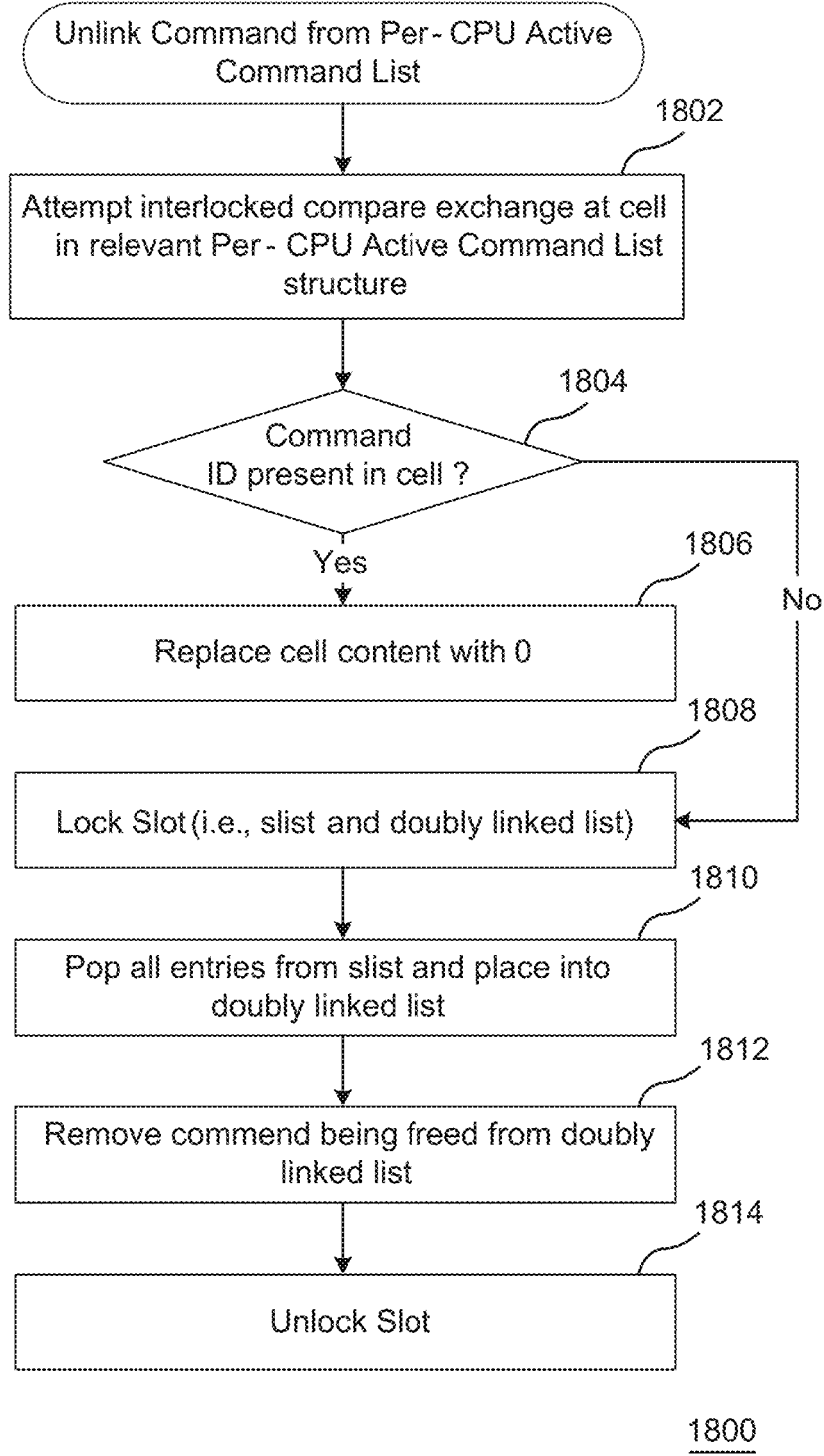
FIG. 18 is a flow diagram illustrating an example of unlinking a command from a per-CPU active command list.
Figure 19:
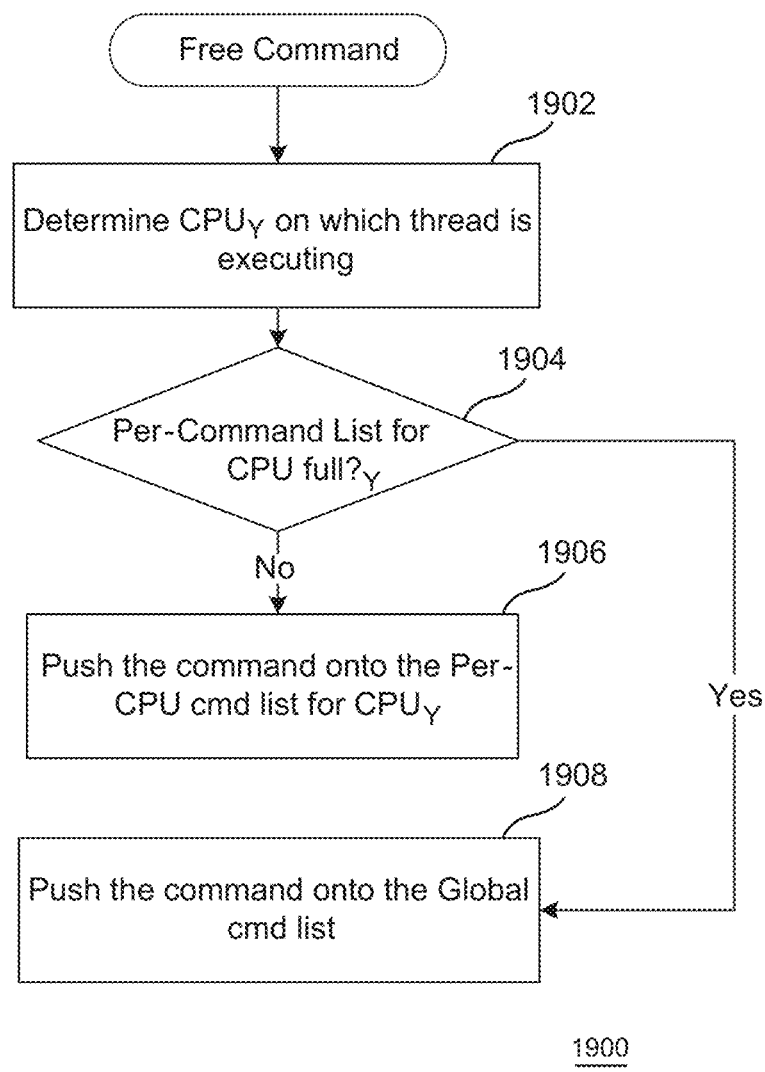
FIG. 19 is a flow diagram illustrating an example of freeing a command according to a per-CPU command list process.
Figure 20:
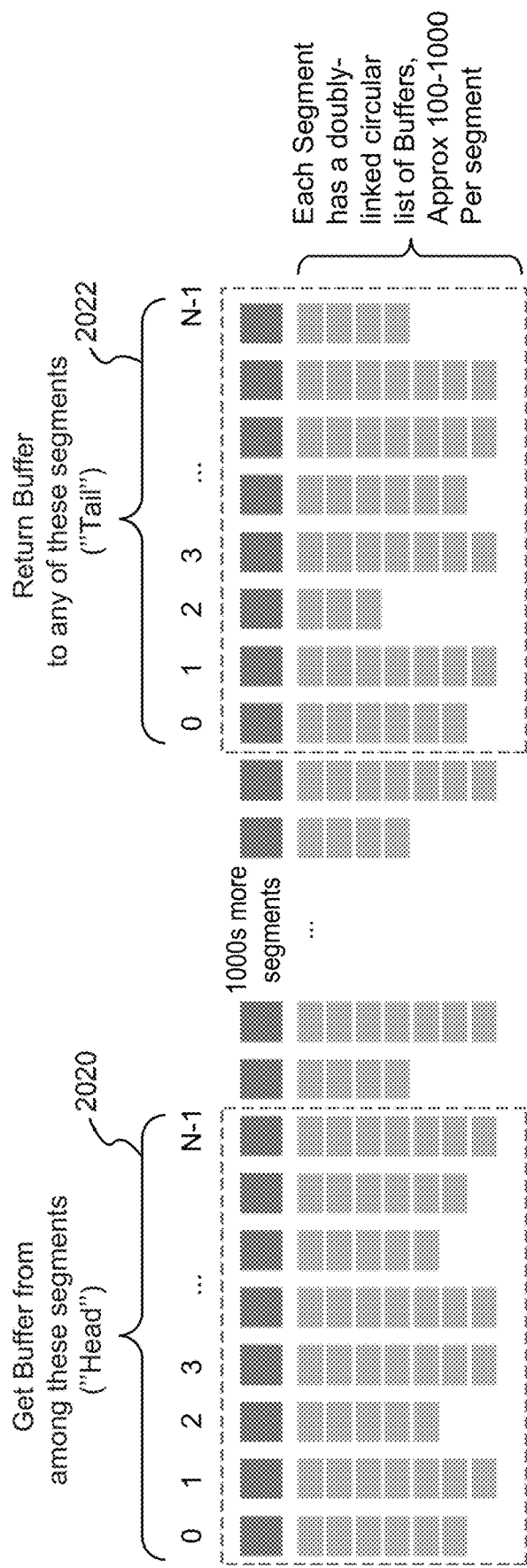
FIG. 20 is a schematic diagram illustrating an LRU buffer configuration.
Figure 21:
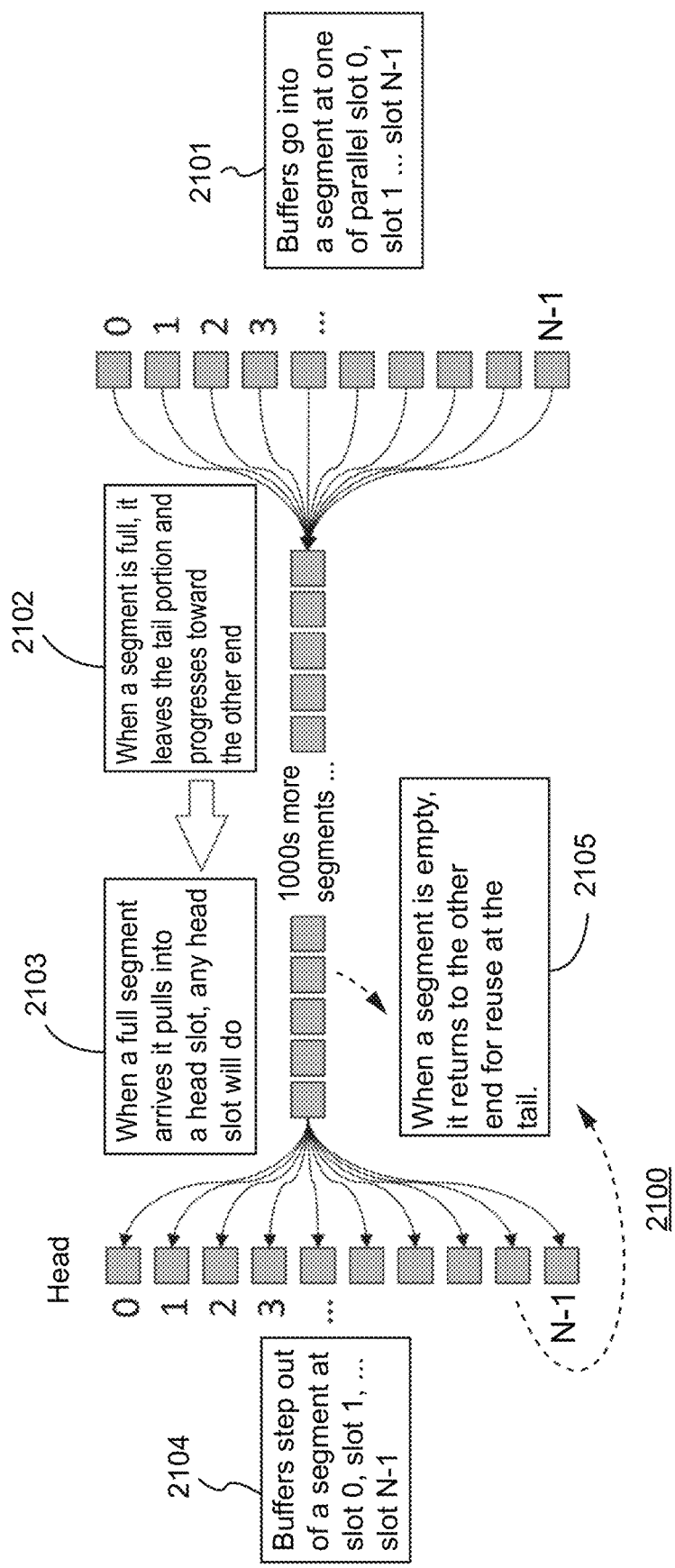
FIG. 21 is a schematic diagram illustrating an LRU buffer configuration and corresponding buffer flow.
Figure 22:
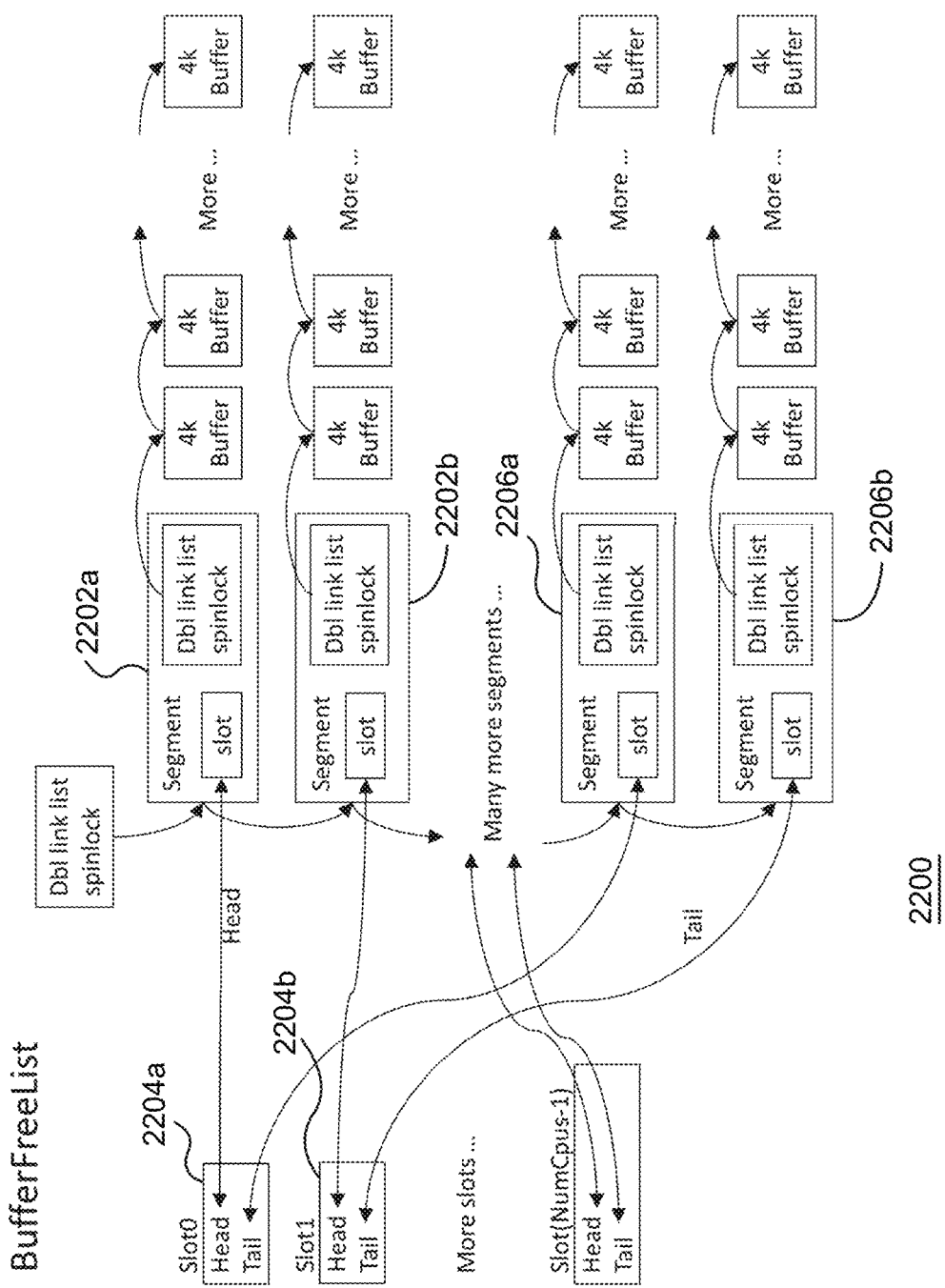
FIG. 22 is a schematic diagram illustrating an LRU buffer configuration including segment configuration.

FIGS. 12A-B and 13-19 illustrate processing of IO Requests and corresponding command management using the described structures. FIGS. 12C-D and 20-25 illustrate processing of IO Requests and corresponding LRU buffer management. FIGS. 12A-D provide overviews of read and write operations. With respect to command list processing, FIGS. 13-15 illustrate command allocation and linking, FIGS. 16A-B illustrate backend queue processing, and FIGS. 17-19 illustrate unlinking and freeing of completed commands. With respect to LRU buffer management, FIGS. 20-22 illustrate LRU buffer configurations and FIGS. 23-25 respectively illustrate Get Free Buffer, Return Free Buffer and Remove Buffer processes.

FIG. 12A is a flow diagram illustrating an example of a read process 1200*a* and providing an overview of the participation of the per-CPU command list 900, per-CPU active command list 1000, and per-volume backend queue 1100 in a typical scenario. An application initiates an IO Request by targeting a logical device according to an offset and length. At the cache level, this entails building 1210 a command targeting the device, offset and length. This involves the per-CPU free command list structure 900 and the per-CPU active command list structure 1000. First a command is allocated 1212 according to the per-CPU free command list process (FIG. 13) and then the command is linked 1214 to a Per-CPU active command list (FIG. 14). Preferably, all incoming commands are subject to these procedures to maintain system coherency (e.g., the ability to further process the IO request and to call back to the thread in the event that it is necessary).

Once this allocation and linking is completed, the command is issued 1216, whereupon the storage virtualization component seeks to resolve the IO Request encoded in the command. This is typically started with an attempt to complete the read from the cache. Presence of the data in the cache may, for example, be determined via hash table lookup.

If it is determined 1218 that there is a cache hit, then a sequence 1220 for a cache hit is undertaken. The data is copied, followed by a free command process. In the cache hit scenario, the free command process merely requires unlinking from the per-CPU active command list (FIG. 18) and pushing the command to the relevant per-CPU or global free command list (FIG. 19). The basic cache hit scenario thus involves the complete and coherent completion of the IO Request in only a few processing cycles, in a fashion that avoids contention with other threads on other CPUs that are seeking to further IO Requests.

If it is determined 1218 that there is a cache miss, then the command is linked 1222 to the relevant per-volume backend queue. While work progresses on the command, the backend queue is updated accordingly. Once the command is completed, a sequence 1224 similar to the cache hit scenario ensues, with the additional requirement to unlink the command from the per-volume backend queue (FIG. 17).

FIG. 12B is a flow diagram illustrating an example of a write process 1200*b* and also indicates that the per-CPU command list, per-CPU active command list and per-volume backend queue are included in a typical scenario. Just as with a read, an application initiates an IO Request (write) by targeting a logical device according to an offset and length. At the cache level, this similarly entails building 1250 a command targeting the device, offset and length, and involves the per-CPU free command list structure and the per-CPU active command list structure. A command is allocated 1252 according to the per-CPU free command list process (FIG. 13) and then the command is linked 1254 to a Per-CPU active command list (FIG. 14).

For a write, the process 1200*b* then allocates 1256 space for the data to be written, and then the command is issued 1258. In one example, all writes are linked to the Per-Volume backend queue, whether the application makes the write request write-through or write-back. If the application requests write-through, then the write request is reported as pending, and a callback is arranged for notification upon completion of the write request, after the data has been committed to the backend. By contrast, when the application submits a write request as a write-back type, the data associated with the write request is "dumped" into cache buffers, and the application accepts the immediate completion of the command, synchronously on the calling application thread, and that a callback will not be received.

Ultimately, the data is written 1260 and then the command is freed, in a fashion similar to that described regarding a read request wherein the backend queue is invoked. That is, the command is unlinked from the Backend Queue, unlinked from the Active Command List and finally pushed to the Per-CPU free command list. In one example, the command free process is used regardless of whether the write request is of the write-through or write-back type.

FIG. 12C is a flow diagram illustrating an example of a read process 1200*c* implementing LRU buffer management. In connection with a read request, an initial procedure may be a build command process 1210. In this example, the build command 1210 portion of the process is the same as set forth in FIG. 12A. Although it is useful to include the command list features along with the LRU buffer features described herein, it should be understood that the command list features are not necessary in all embodiments of the LRU buffer aspects of the invention.

The read request is typically directed to storage according to a number of equally sized portions (e.g., 4K). The basic elements of the LRU buffer are organized accordingly. These elements may be referred to as buffers. A single (e.g., 4K) buffer is thus the basic component of the LRU buffer. The LRU buffer configuration described further below is a data structure that organizes many hundreds of thousands of buffers in the LRU. In connection with responding to the read request, following the command build (1210), an initial step entails assembling 1230 a Buffer List, which is a list of buffer-sized portions, each associated with a virtual address corresponding to a portion of the read request.

It is possible that all, none, or some of the portions of the read request (the entries in the Buffer List) will be found among the entries in the LRU buffer (i.e., in cache). The LRU buffer includes numerous buffers with the "newest" being at or near the tail portion and the "oldest" being at or near the head portion of the LRU buffer. "Get Buffer", "Remove Buffer" and "Return Buffer" are three basic processes in connection with managing the LRU buffer. Get Buffer pulls one of the oldest buffers from the head portion so that it can be used for a new IO request. Remove Buffer removes a buffer from anywhere within the LRU buffer. Typically, this would be in connection with a cache hit (e.g. hash lookup). Return Buffer returns a buffer to the tail portion of the LRU buffer.

In the situation where all of the entries in the Buffer List are determined 1232 to be a cache hit (i.e., they are all found in the LRU), a Remove Buffer process is performed for each entry in the Buffer List, the data is copied from the buffers to the application address space, and then a Return Buffer process is performed for each item in the Buffer List, as shown in step 1234. This essentially places all of the buffers corresponding to the read request at the tail portion of the LRU buffer at the conclusion of the read request. In this way, the reuse of these buffers is delayed as long as possible, thus maximizing the probability that a subsequent request will result in a cache hit. Once the buffers have been cleared, the free command process is performed to free the command (see, e.g., FIG. 12A and FIGS. 13-19 for the optional command list aspects).

It is noted that an ordinary read of data (e.g., data requested by an application) would be placed at the tail portion of the LRU as described. There are certainly exception situations. For example, there may be read requests that are known to be transient in nature (e.g., an internal usage of data rather than an application-request for data). In this case, Return Buffer may direct the buffers for these types of IO requests to the head portion of the LRU buffer, so that they do not unnecessarily clog the full length of the LRU with entries that are unlikely to be requested subsequently.

If it is determined (1232) that not all of the entries in the Buffer List are a cache hit (i.e., in LRU buffer) then either no entry is in the LRU buffer, or some of the entries are in the LRU buffer. In this scenario, the processes of step 1236 are performed. For the entries that are in the LRU buffer, a Remove Buffer process is performed. There, the buffers are retrieved from the LRU buffer to (ultimately) satisfy the read request, and for eventual placement at the tail portion. For the entries that are absent from the LRU buffer, there is a need to pull a buffer that will ultimately be used for that portion of the read. The Get Buffer process gets a buffer from the head portion of the LRU buffer for each such entry of the Buffer List and reassigns each buffer to the corresponding virtual address of the request. These "cache miss" entries in the Buffer List are queued for completion (i.e., retrieval of data). Once all the data for each entry in the Buffer List is retrieved, the data is copied into the application address space, and the Return Buffer process is performed to place the buffer entries at the tail end portion of the LRU buffer. Once all the buffer processes are cleared, the free command process can be performed to free up the command for other usage.

FIG. 12D is a flow diagram illustrating an example of a write process 1200d implementing LRU buffer management. Again, the build command process 1250 is optional but useful in connection with the LRU buffer management features. The build command process 1250 is as described in connection with FIG. 12B above.

As with the read process 1200c, the write process 1200d continues by assembling 1270 the Buffer List. This also is essentially the same as is described in connection with the read process 1200c (step 1230).

Again, the entries in the Buffer List may or may not be present in the LRU buffer. As indicated in step 1272, the Remove Buffer process is performed for each Buffer List entry that is a cache hit (in LRU buffer) and the Get Buffer process is performed for each Buffer List entry that is a cache miss (absent from LRU buffer).

The command is then issued 1274, wherein, for example, the application is signaled to send data into the buffers. Where the command list processes are invoked, the corresponding command may be linked to the Per-Volume Back-end Queue where necessary.

The Buffer List is thus readied for the write. In step 1276, the data is then written into the buffers, the Return Buffer process is performed for each entry in the Buffer List, and where applicable the free command process is performed to free the command for other IO requests.

FIG. 13 is a flow diagram illustrating an example of a process 1300 for allocating a command. Generally, the process 1300 implements "N" per-CPU command lists in conjunction with a global list in order to allocate commands in parallel on a multicore processing platform. An application thread (or other type of thread, such as a poller thread) will be executing on one of the CPUs as the IO Request is received and slated for processing. Each CPU has one of the per-CPU command lists (0 through N−1) associated therewith. The associated per-CPU command list is determined 1302 according to which CPU the thread is executing on at the time that the IO Request is being processed. Thus, if the thread is running on CPU3, it will look to the per-CPU command list for CPU3. If it is determined 1304 that the corresponding per-CPU command list is not empty, then the next command is popped 1312 from the currently associated per-CPU command list. Each per-CPU command list is preferably an atomic lock-free slist to minimize the cost of coordination required in order to pop the command from the list in a thread-safe manner. In the command freeing process that is described below, it is noted that at times a command free process may push a command, once completed, to another per-CPU command list. Because of this, there may be times where any given one of the per-CPU command lists empties. If it is determined 1304 that this is the case, then the global command list is the next possible source of an available command slot. If the global command list is not empty, then the process pops 1310 the next command from that list. If the global command list is also empty, then the process progresses through remaining per-CPU command lists, finds 1308 a per-CPU command list that is not empty, and pops 1312 the command from that associated per-CPU command list. The command lists (per-CPU and global) are slists with atomic variables, and so they are "thread-safe" for the processing of the command even if the list from which a free command is obtained does not "belong" to a particular CPU. In this way, contention among many threads attempting to allocate commands simultaneously on a multicore platform is drastically reduced, thus lowering latency along that code path, and increasing parallelism and throughput of the system.

FIG. 14 is a flow diagram illustrating an example of a process 1400 for linking a command to a per-CPU active command list. As explained above, the per-CPU Active command list includes three components, a cell, an slist, and a doubly linked list. There are also N slots (0 through N−1) corresponding to the N CPUs, each being CPU cache aligned. Generally, linking a command to the per-CPU active command list entails firstly attempting to use the cell (fastest and most computationally efficient) followed by the lock-free atomic slist (slightly more costly) and then the spinlocked doubly linked list (most costly).

Initially, an interlocked compare exchange is attempted 1402 at the cell that is relevant to the per-CPU active command list for the CPU on which the thread is executing. If it is determined 1404 that a null value is present (0), then this indicates that the cell is free and the command ID is pushed 1406 to the cell. The presence of the command ID in the cell will indicate occupancy of the cell slot in a subsequent linking to the corresponding active command list. That is, while the cell is used for one command, it cannot be used for another. However, when the existing command represented in the cell is unlinked, a 0 is written to the cell to return the cell to "available" status.

If accessing the cell fails and it is determined 1408 that space within the slist is available (i.e., not fully occupied) then the command 1410 is pushed to the slist. Where both the cell and the slist are not available, the doubly linked list is locked 1412, and the command is put onto that list, and then the doubly linked list is unlocked. The number of entries available in the slist can be configured as desired, balancing the need for the list to have sufficient entries to accommodate usage of the slist without constantly having to go to the doubly linked list, against the overhead that is required to process the slist when it is moved down to the doubly linked list (i.e., more entries, more difficult to clean up). In one example, each slist has 16 entries to strike this balance.

As is evident from the allocating and linking processes, when a cache hit is involved, the IO Request can be immediately furthered with just the processing required to allocate the command (per-CPU slist process) and an extremely efficient interlocked compare exchange, or a still very efficient slist in most instances. Even where a lock for the doubly linked list is invoked, it is only for the per-CPU active command list, and does not interfere with other commands going forward in other per-CPU slots.

FIG. 15 is a flow diagram illustrating an example of a process 1500 for linking a command to a per-volume backend queue. Circumstances will arise where an IO Request is not immediately processed, such as a read that results in a cache miss. There, some backend work is required in order to complete the IO Request. The per-volume backend queue is added so that it can provide a mechanism for listing and removing commands without requiring repetitive access to and potential locking of the per-CPU lists. As introduced above, each per-volume backend queue uses a doubly linked list as the main queue or list, and a removal list (an slist) that is used to list commands whose removal is pending. Although locking is required to add a command to the per-volume backend queue, it is done in a simple lock-add-unlock operation such that the lock is not held for a long period of time. Specifically, a given command indicates the volume Vx at which an IO Request is targeted. On the cache miss, or where otherwise necessary, the per-volume backend queue for the target volume is locked 1502, the command is added 1504 to the doubly linked list in that particular per-volume backend queue, and then the per-volume backend queue is unlocked 1506. These operations occur in the requesting application or poller context.

FIGS. 16A-B are flow diagrams illustrating iterator begin 1600a and end 1600b processes in association with a per-volume backend queue. Inclusion in the backend queue presumes additional processing to complete the IO Request associated with the command. A typical example of listing a command in the backend queue is upon a read request with a cache miss. In that instance, typically, other ("worker") threads retrieve the necessary data, update the cache, and indicate readiness for removal from the backend queue. These worker threads and some other threads that access the backend queue may be referred to as "iterators" that are working the list of commands in the backend queue. If there were no special consideration given to parallelism in the implementation of the backend queue, the iterators would need to lock the per-volume backend queue in association with command processing, possibly for extended periods as when they iterate through the potentially long lists of commands queued for backend processing. If the backend queue were solely a doubly linked list with a spinlock, the worker threads would often need to lock the queue for extended periods in order to access the queue, perform processing, and then update the queue.

By contrast, with the removal list and the iterator_count variable (iterator_count=number of iterators working the queue), a worker thread holds the spinlock of the backend queue only long enough to increment the iterator_count for the relevant per-volume backend queue, save the head and tail pointers for the queue, and then release the spinlock. With the iterator_count greater than 0, and the atomically updatable removal list, the worker thread can browse the backend queue confident that the list will not be corrupted by the actions of other threads, because other threads will mark commands for deferred removal (i.e., push them to the removal list), instead of trying to entirely unlink them from the queue immediately.

The add iterator process 1600a commences with locking 1602 the per-volume backend queue for the relevant (IO Request target) volume Vx. The iterator_count variable of the per-volume backend queue Vx is incremented 1604. The head and tail for the doubly linked list in the per-volume backend queue Vx are saved 1606 and then the per-volume backend queue Vx can be unlocked 1608. The thread (and any other threads working the queue) may go forward with processing, without having to hold the lock for the backend queue.

The end iterator process 1600b (FIG. 16B) may be best understood by first referring to the process 1700 for unlinking a command from a per-volume backend queue, as shown in FIG. 17. The per-volume backend queue for the relevant volume (Vx) is locked 1702, then reference to the value of the iterator_count variable is made to determine if there are iterators working the queue. If it is determined 1704 that there are no iterators present, then the corresponding command can be unlinked 1708 from the doubly linked list of the per-volume backend queue. In other words, an iterator count of 0 means there is no concern that iterators are accessing the list, so there is no concern that unlinking the command will disturb another thread walking through the list, so the command is quickly unlinked from the doubly linked list and the spinlock is released 1710, having been held for a minimum of time. If, however, there are iterators present (iterator_count>0) then the command is pushed 1706 in a relatively simple atomic operation to the removal list (a lock-free atomic slist), and the spinlock is released 1710, having been held for a minimum of time. This means that the queue is not locked for long periods of time when iterators are present, since the command can simply be pushed to the removal list. And when iterators are not present, there is less contention potential, and a relatively straightforward removal of one command from the doubly linked list can be made.

Referring again to FIG. 16B, the end iterator process 1600*b* pertains to where an iterator is done working the per-volume backend queue. Again, the per-volume backend queue for the relevant volume is locked 1620. Here, the iterator_count variable is decremented 1622.

If iterator_count is down to 0 (i.e., the last iterator working the queue is done), then (in step 1624) all of the entries in the removal list for that volume are popped, with each of these commands unlinked from the doubly linked list as they are popped from the removal slist. This maintains the integrity of the queue since the operation is only performed when no other iterators are presently working the commands in the queue. If the iterator_count is greater than 0, then step 1624 is not performed due to the remaining presence of other iterators. Afterwards, the per-volume backend queue is unlocked 1628.

A worker thread may sometimes need access to all of the pending commands for a volume Vx, and such commands may be on various per-CPU active command lists and per-volume backend queue. A flush operation may be used wherein each per-CPU active command list is accessed and any commands pertaining to volume Vx are moved to the per-volume backend queue for volume Vx, permitting the complete list of commands for the volume to be examined.

In a free command process, a command must still be unlinked from the per-CPU active command list to free the command. FIG. 18 is a flow diagram illustrating an example of a process 1800 for unlinking a command from a per-CPU active command list.

On the linking process, it was noted that the cell was firstly attempted with respect to the command in question, whereupon if the cell was available, the command ID was placed in the cell. Here, again, a very efficient interlocked compare exchange is used to examine whether the command to be unlinked is listed in the cell. However, instead of the presence of a "0" on the linking side (indicating cell availability), the attempted 1802 interlocked compare exchange looks to see whether the cell contents are the command ID for the command being unlinked. If it is determined 1804 that the command ID is present, then a 0 can be written 1806 to the cell, which indicates cell availability for a subsequent linking attempt. Also, the command is thus unlinked from the per-CPU active command list.

If it is determined that the cell contents are not the command ID, this means the command is either in the slist or the doubly linked list. On the linking side, the slist can simply be used up to its capacity, which helps throughout on the linking side. However, removal requires popping 1810 the entries in the slist into the doubly linked list, then removal 1812 of the command being unlinked from the doubly linked list (could have been in the slist, could have already been in the doubly linked list), and finally unlocking 1814 the slot for the relevant per-CPU active command list.

Finally, the command can be freed to a command list. FIG. 19 is a flow diagram illustrating an example of a process 1900 for freeing a command according to a per-CPU command list process. During processing of the IO Request, although it is not typical, a thread may have been moved from one CPU to another. The free command process 1900 simply seeks to push the command onto the list corresponding to the CPU on which the thread is executing at the time the command is freed. Firstly, it is determined 1902 which CPU the thread is running on, and if the per-CPU command list ($CPU_y$) is determined 1904 not to be full, the command is simply pushed 1906 onto that per-CPU command list $CPU_y$. If the relevant per-CPU command list is full, then the command is pushed 1908 to the global free command list.

It is understood that popping a command from one per-CPU command list and not necessarily pushing the command to the same per-CPU command list will potentially result in imbalance conditions. Accordingly, periodically, the per-CPU lists can be rebalanced to default conditions.

FIG. 20 is a schematic diagram illustrating an LRU buffer configuration 2000.

It is useful to consider a typical serial LRU buffer before moving to the details of the LRU buffer configuration 2000 according to this aspect of the disclosure. A typical serial LRU buffer could entail a single (large) doubly-linked circular list of buffers. A single head pointer points to the oldest (least recently used) buffer and a single tail pointer points to the youngest (most recently used) buffer. A spinlock would guard the entire list.

With this approach, taking a buffer from the head would require taking a global spinlock guarding the entire LRU buffer, modifying the global list head/tail, and releasing the spinlock. This creates a lock convoy and cache line contention, preventing scaling on multicore platforms.

By contrast, the LRU buffer configuration 2000 includes a head end portion 2020 and a tail end portion 2022, each with multiple parallel points of entry, in lieu of single head and tail points. In one example, the head end portion 2020 includes the number of slots corresponding to the same number of CPUs ("N") on the multicore platform (denoted as slots 0 through N−1). A segment corresponds to each slot, and each segment includes a doubly-linked circular list of buffers. The number of buffers in each segment may be configured according to design choices, but in this example a range of 100-1000 buffers per segment is used. The tail end portion 2022 similarly includes respective slots corresponding to the number of CPUs, with the slots also including segments according to the same characteristics of the head end portion 2020. In addition to the head end portion 2020 and the tail end portion 2022, the LRU buffer configuration 2000 includes many more segments (e.g., thousands) between the head and the tail. Like each segment, the overall list of segments (tail, middle, and head) is a doubly linked list with a spinlock. However, with this configuration 2000, it is not necessary to lock the entire list of segments to access any individual segment.

As mentioned, each segment has its own doubly linked list of buffers. This allows parallel access to any tail slot segment, any head slot segment, or any intervening segment to engage with any given buffer (get, remove, return) without having to lock the entire list of segments (i.e., access and movement of individual buffers can occur without locking the whole LRU buffer to other accessors).

Additionally, with this configuration 2000, getting a free buffer from the head does not require the exact, one-and-only oldest buffer. Similarly, when returning a buffer to the tail, it does not need to be queued at the exact, one-and-only end of the list. Rather, an available slot at or near each end is used, with that slot generally corresponding to the CPU of the caller corresponding to the buffer request. The head and tail spread out, each becoming a loosely defined set of elements, rather than a unique Head and unique Tail.

In effect, when the number of buffers runs into the hundreds of thousands or millions, the "head" and "tail" areas can be thousands of elements each, and the resultant lifetime for each individual element becomes more or less the same. That is, the time it takes for any given element to move through the list, from its insertion somewhere near the tail, to its extraction and reuse somewhere near the head, is nearly the same as it would have been in a serial-only implementation with exact head and tail elements. At the same time, the head and tail portions are configured for parallel entry and exit.

The LRU buffer configuration retains a doubly-linked list environment to facilitate fast addition and removal of buffers, but avoids a single highly contended lock for a single list by breaking the LRU into many segments. Each segment contains a shorter doubly-linked circular list of many elements (buffers), and there can be many thousands of segments. The head becomes a list of head pointers, one per CPU, each pointing one of the many segments near the head of the segment list. Similarly, a list of tail pointers, one per CPU, respectively point to one of the many segments near the tail of the segment list. And in between, there are potentially thousands of segments making their way slowly from the tail to the head.

FIG. 21 is a schematic diagram illustrating an LRU buffer configuration 2100, essentially showing the same configuration as found in FIG. 20, but with an alternative depiction of the head and tail portions and further illustration of the migration of buffers into, across and out of the configuration 2100.

At the tail portion of the configuration 2100, buffers enter 2101 segments respectively corresponding to parallel slots. In one example, there is one slot per CPU, with the N slots respectively corresponding to $CPU_0$ through $CPU_{N-1}$ as indicated. This entry of a buffer into the LRU buffer configuration 2100 may be referred to as "returning" a buffer to the LRU buffer configuration, since it often occurs following a removal of a buffer from the LRU, or getting a buffer off the head end portion. Additionally, each segment preferably includes multiple buffers, so the segment will not be full until it reaches its capacity of buffers.

Once any given one of the segments is full, it leaves the tail portion and enters 2102 the central portion of the LRU buffer configuration 2100 so that it can progress towards the head end. As mentioned, there is an overall list of segments, and that list remains in place even where a segment leaves the tail portion. A pointer may be used to indicate which segment corresponds to any given tail slot, or similarly any given head slot. A segment may then easily "leave" the tail portion by updating the pointer for the tail slot in which the segment resides. That pointer can also be updated to reflect the new segment corresponding to the slot when this occurs.

The segments then progress toward the head. They do this by progressing along the doubly linked list of segments. When a given segment arrives at the head portion, it enters 2103 into any one of the slots at the head portion. As with the tail portion, the head portion preferably includes N slots respectively corresponding to $CPU_0$ through $CPU_{N-1}$. At the head portion, the segment preferably enters 2103 the first available slot that becomes available. To explain, a segment at the head portion includes a full set of buffers upon its arrival. Individual buffers are freed 2104 from the LRU from among the segments at the tail end. Once a head slot segment is emptied of its last buffer (i.e., its segment is empty), then the segment is free 2105 and the slot is available to an incoming segment. Additionally, the free segment is then available for reuse at the tail end portion. It is also noted that a mid-stream segment can empty as well. That segment can also be made free 2105 for usage.

The freeing or "cleaning up" of segments can be done periodically at times of processing convenience, or sometimes necessity. Since this would entail locking the segment list, it is preferred to not repeatedly clean the list by freeing each individual segment at the moment it becomes ready, as this would create contention. Another aspect of this disclosure is that, in lieu of actual remove of the empty segment, it is scheduled for cleanup, rather than engaging in the actual cleanup itself. This may be in the form of a list of segments that need to be removed from the segment list at some point in time.

FIG. 22 is a schematic diagram illustrating an LRU buffer data structure 2200 including further segment details. The LRU buffer data structure 2200 and corresponding algorithms preserve the aging behavior of the simpler serial LRU linked list, including the support of "get", "remove", and "return" buffer procedures. At the same time, the structure 2200 accommodates multicore details to maximize parallelism, using a segmented structure and features to preserve locality on CPUs.

The Buffer Free List is a doubly-linked list of Segments (e.g., 2202a, 2202b, 2206a, 2206b, etc.). This list of Segments is guarded with a spinlock for thread safety. In addition, each individual segment has its own doubly-linked list of Buffers (e.g., 4K Buffers). The number of Buffers per segment can vary between 0 and well over 1000, but in one example, it is preferred to keep the number of Buffers per Segment between 100 and 1000 Buffers.

Each Segment supports assignment to either a Slot Head or a Slot Tail, or neither, but not both a Slot Head and a Slot Tail. Specifically, a segment is assigned as exactly one Slot's Head, or it is assigned as exactly one Slot's Tail, or it is not assigned at all. For example, Segment 2202a is assigned to the Head of Slot 0 (reference 2204a), and Segment 2206a is assigned to the Tail of Slot 0 (2204a). Specifically, Slot 0 includes one pointer to the segment currently designated as "head slot 0" and another pointer to another segment currently designated as "tail slot 0" Similarly, Segment 2202b is assigned to the Head of Slot 1 (2204b) and Segment 2206b to the Tail of Slot 1 (2204b). At the same time, numerous segments that are between the head and tail may have an "unassigned" status for a Head or Tail.

It should also be appreciated that the members of the head and tail portions of the LRU buffer are not rigidly assigned pieces of the list of segments. In other words, with reference to FIG. 20, Slot Head 0 does not have to be the very end-most segment at the head end in the segment list, and Slot Tail N−1 does not have to be the very end-most segment at the tail end. Returning to FIG. 22, the pointers can thus point to any segment within a respective head or tail portion, as relatively indicated by the pointers for Slot (N−1).

Figure 23:
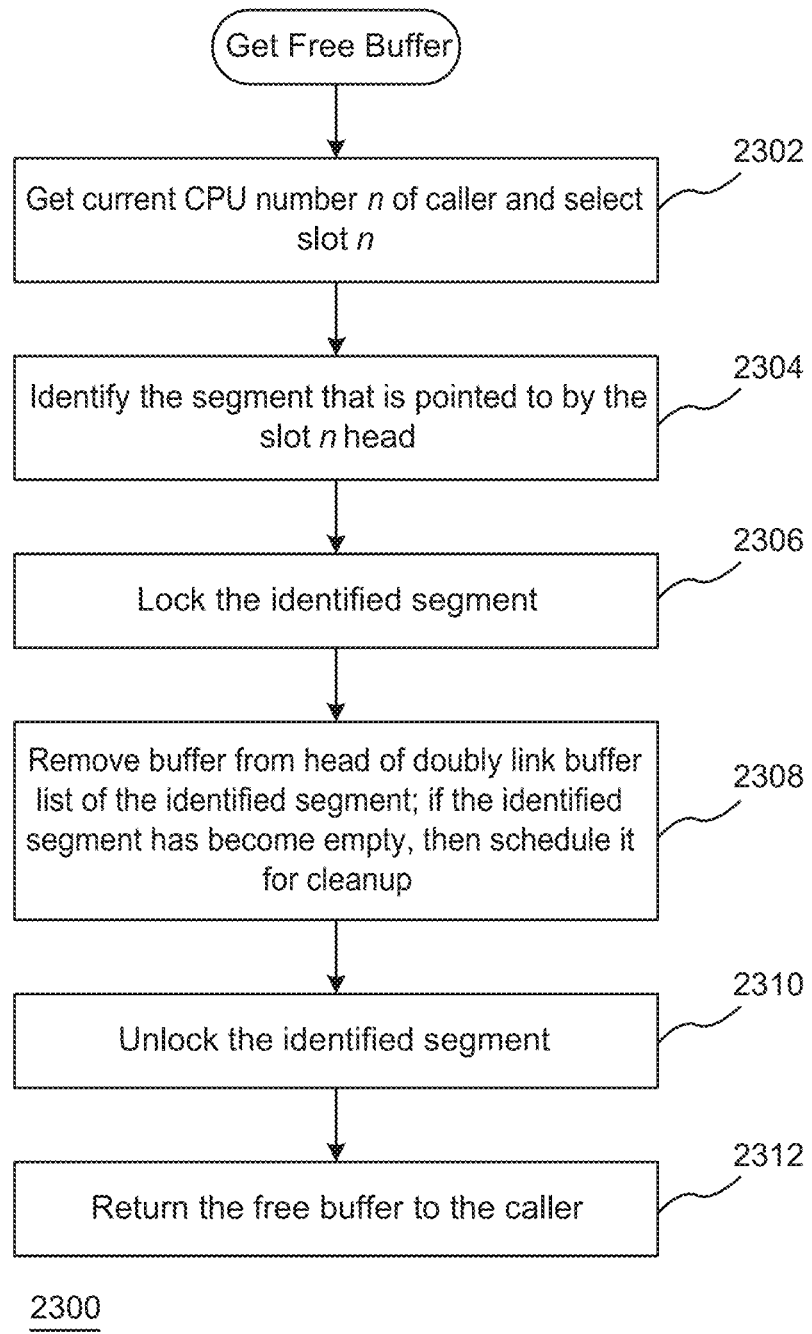
FIG. 23 is a flow diagram illustrating a get free buffer process.

FIG. 23 is a flow diagram illustrating a Get Buffer process 2300. This process 2300 obtains a free buffer from the head portion of the LRU buffer. At or near the end of an IO Request, whether read or write, it is desired to populate the LRU buffer at the tail portion accordingly, since either will be the most recently used. Additionally, there may be a cache miss situation, where the IO request is directed to data not found in the LRU buffer. The get free buffer process 2300 makes available a free buffer from the head portion, and that free buffer can be circulated back into the LRU buffer in connection with the completion of an IO request. Typically, this recirculation is back to the tail portion, but it also could be directed to the head portion for transient data or the like.

The process 2300 begins by getting 2302 the current CPU number (n=0 . . . N−1) of the calling application thread and selecting the Slot n corresponding to that CPU number.

The segment that is pointed to by the Slot n head is then identified 2304. Again, each slot has a head pointer and a tail pointer. If no segment is assigned as the Slot n head, then an unassigned segment is selected from the oldest part of the segment list.

The doubly linked list for the identified segment is locked 2306, and the buffer at the head of the doubly linked list is removed 2308. If this results in the segment becoming empty, then the segment is scheduled for cleanup. As mentioned, this is preferably in the form of deferred scheduling, listing the segment for removal from the overall list of segments later on.

The doubly linked list for the identified segment is then unlocked 2310 and the free buffer is given 2312 to the caller.

Figure 24:
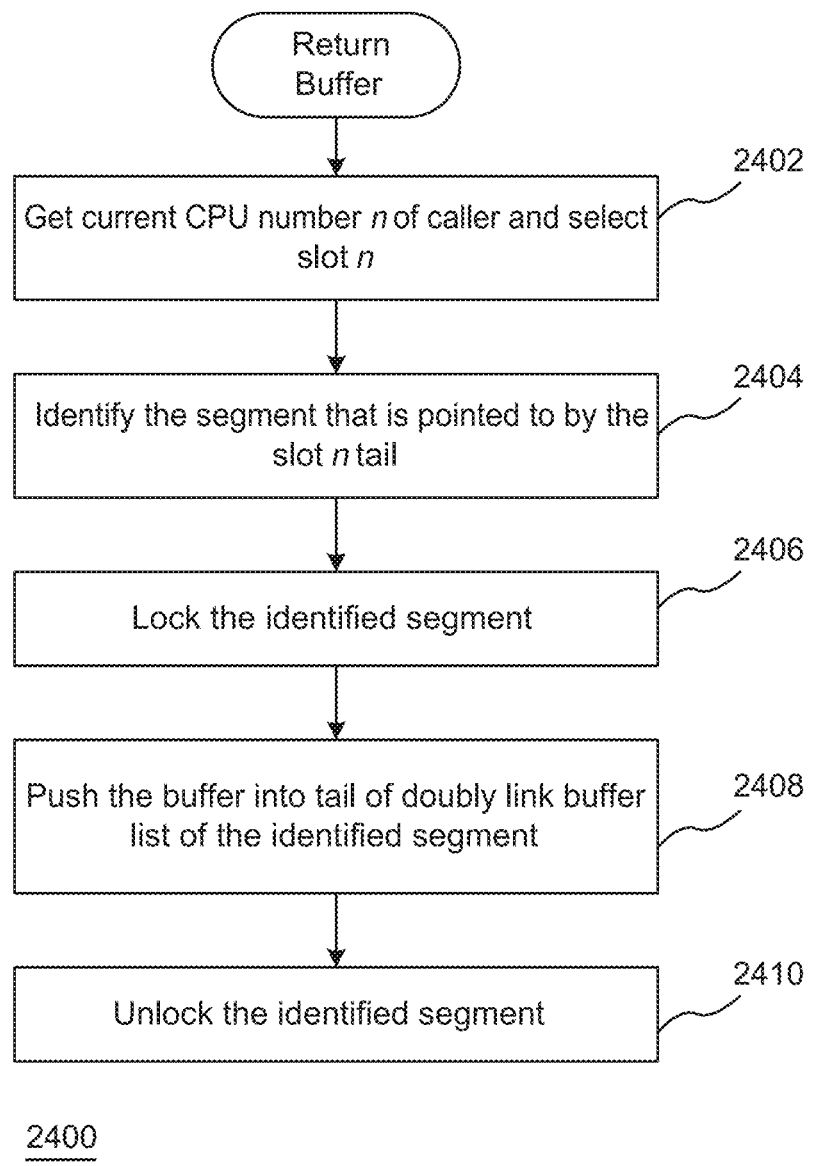
FIG. 24 is a flow diagram illustrating a return free buffer process.

FIG. 24 is a flow diagram illustrating a Return Buffer process 2400. In the Return Buffer process 2400, a buffer is returned to the LRU configuration at the tail portion. This typically follows an IO Request, reflecting the recently used data corresponding to the buffer. The CPU number (n=0 . . . N−1) has a corresponding slot at the tail portion, and that Slot n is selected 2402. The segment that is pointed to by the Slot n tail is then identified 2404. If no segment is assigned as the Slot n tail, then an empty segment is allocated, linked into the segment list, and assigned as the Slot n tail. The doubly linked list for the identified tail segment is locked 2406, and the buffer is pushed 2408 into the tail of the doubly linked buffer list of the identified segment. The identified segment is then unlocked 2410. If the segment is full (e.g., contains more than 1000 buffers if that is the designated amount), the segment is unassigned from this Slot's Tail, and it is linked into the larger list of Segments such that it will begin making its way toward assignment at the Head portion of the LRU buffer.

Figure 25:
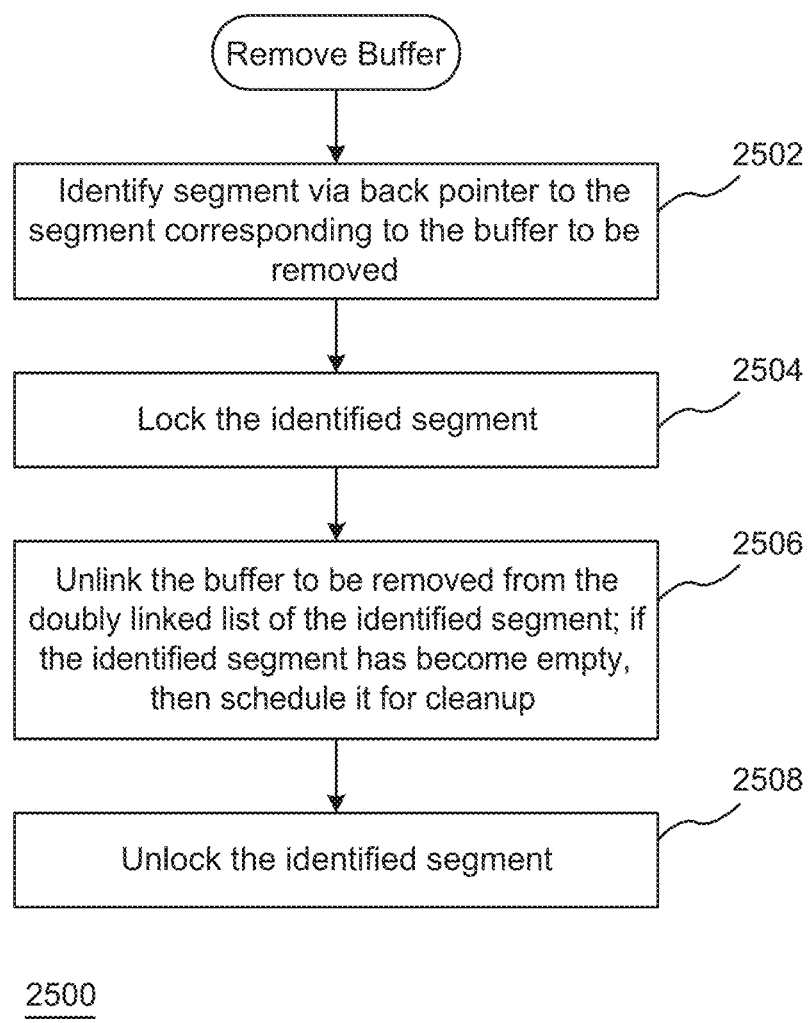
FIG. 25 is a flow diagram illustrating a remove buffer process.

FIG. 25 is a flow diagram illustrating a Remove Buffer process 2500. Sometimes, it is desirable to remove a buffer from the LRU prior to its natural exhaustion at the head portion. Typically, this will be done on a cache hit (i.e., the buffer is in the LRU buffer). The remove buffer process 2500 accommodates the extraction of any given buffer in the LRU without compromising the integrity of the LRU buffer configuration. Initially, the segment corresponding to the buffer slated for removal is identified 2502. This may be performed via a back pointer to the segment. Preferably, each buffer includes a back pointer to the segment in which it resides. The segment's list of buffers is then locked 2504.

The buffer to be removed is then unlinked 2506 (removed) from the doubly linked list of the corresponding segment. Again, if this results in the segment becoming empty, then the segment is scheduled for cleanup. The identified segment can then be unlocked 2508.

Figure 26:
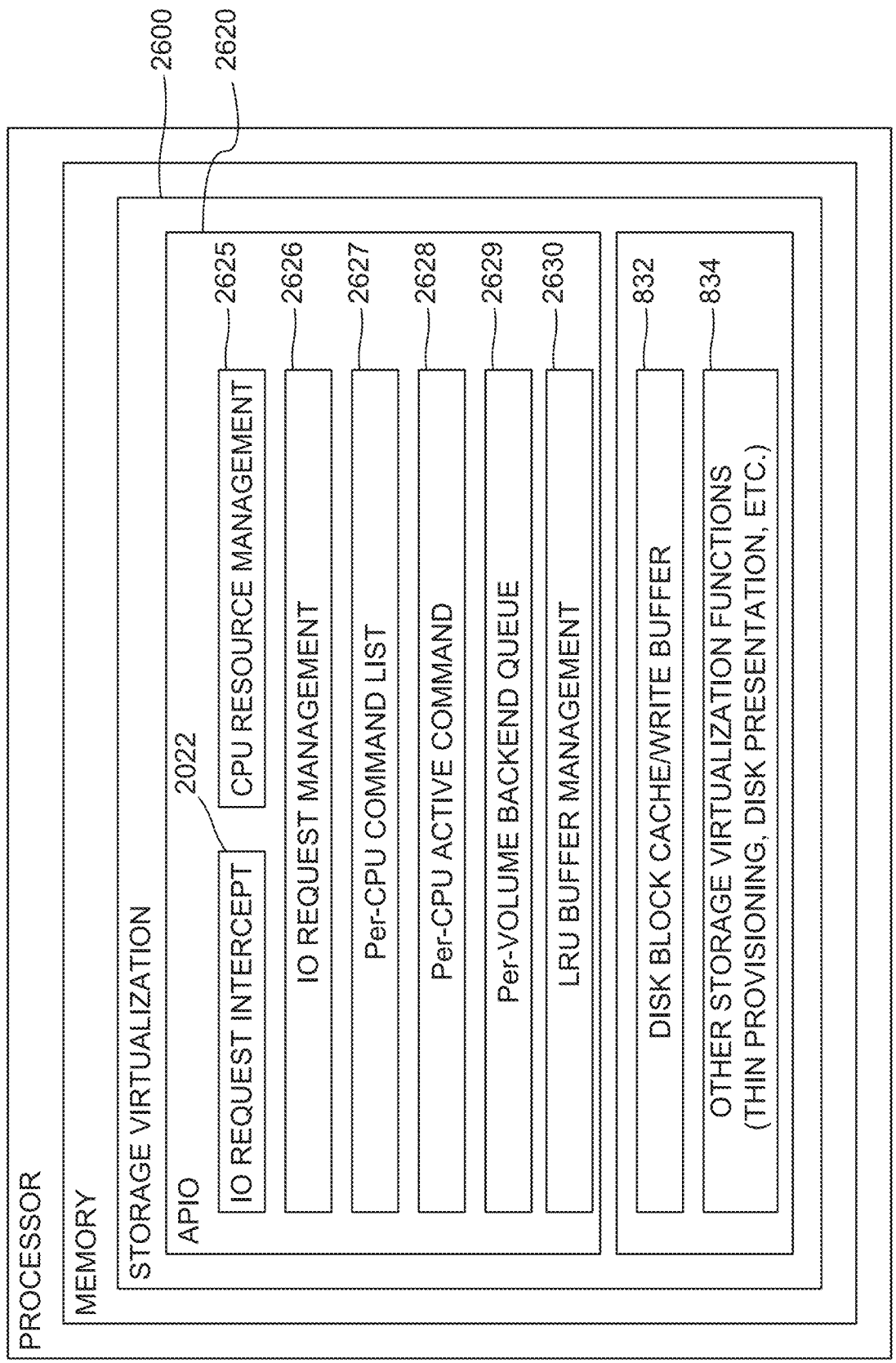
FIG. 26 is a block diagram illustrating an example of storage virtualization with an adaptive parallel IO component including command list processing and LRU buffer management.

FIG. 26 is a block diagram illustrating an example of a storage virtualization (SV) component 2600 with an adaptive parallel IO (APIO) component 2620 including command list processing and LRU buffer management.

The general characteristics of the SV component 2600, as well as the IO Request Intercept 2622, CPU Resource Management 2625 and IO Request Management 2626 aspects of the SV component 2600 are described above in connection with FIG. 7 and need not be repeated. Similarly, the disk block cache/write buffer 832 and general storage virtualization functions 834 (such as disk presentation, thin provisioning, etc.) also are described and need not be repeated.

The APIO component 2620 also includes Per-CPU Command List Management 2627, Per-CPU Active Command Management 2628, Per-Volume Backend End Queue Management 2629 and LRU buffer management 2630 components.

The Per-CPU Command List Management 2627 component is configured to maintain the per-CPU and global command lists and to perform the allocate command and free command processes described above. The Per-CPU Active Command Management 2628 component is configured to maintain the per-CPU active command lists and to perform the link command to active command list and unlink command from active command list processes described above. The Per-Volume Backend Queue Management 2629 component is configured to maintain the per-volume backend command queues and to perform the link command to per-volume backend queue, unlink command from per-volume backend queue and begin/end iterator processes described above. The LRU Buffer Management 2630 component is configured to maintain the LRU buffer as described above, and to perform the Get Free Buffer, Return Free Buffer and Remove Buffer processes as described above.

The SV component 2600 including the APIO component 2620 may be provided as software, such as resident in memory for execution by a processing unit (including multi-core professing platforms). It may also be provided as stored on a non-transitory computer readable medium (e.g., a disk) for downloading, uploading, selling, distributing, etc. of the SV component 2600 with the APIO component 2620. A computer apparatus with a processor and memory may also be provided as an execution platform for the SV component 2600 including the APIO component 2620. Examples of a computer apparatus include but are not limited to storage servers, storage area network servers, desktop computers, laptop computers, tablet computers, smartphones, and others.

Thus, methods, articles or manufacture and apparatus for performing parallel IO operations with command list management are provided in accordance with the present invention. Although considerable detail with reference to certain embodiments is provided herein, the invention may be variously embodied without departing from the spirit or scope of the invention. Therefore, the following claims should not be limited to the description of the embodiments contained herein in any way.

The invention claimed is:

1. A method for LRU buffer management in performing parallel IO operations, the method comprising:
    requesting a free buffer from a single LRU buffer list in response to an IO request, the single LRU buffer list including a head portion, the head portion including a plurality of head slots respectively accessible in parallel;
    selecting a first head slot from the plurality of head slots included in the head portion of the single LRU buffer list; and
    obtaining the free buffer from the first head slot.

2. The method of claim 1, further comprising:
    identifying a first segment corresponding to the first head slot, the first segment including a list of buffers;

obtaining the free buffer from the first head slot by identifying a head buffer within the list of buffers included in the first segment and removing the head buffer as the free buffer.

3. The method of claim 1, wherein the single LRU buffer list is accessible in parallel by a plurality of CPUs that are included on a multicore platform, the plurality of CPUs being respectively associated with the plurality of head slots, such that a first CPU is associated to the first head slot, a second CPU is associated to a second head slot, through a number N of CPUs and N corresponding head slots.

4. The method of claim 3, wherein the single LRU buffer list includes a tail portion, the tail portion including a plurality of tail slots respectively accessible in parallel.

5. The method of claim 4, further comprising:
returning the free buffer to the single LRU buffer list at a first tail slot of the plurality of tail slots, the first tail slot being associated with the first CPU.

6. The method of claim 5, further comprising:
identifying a second segment corresponding to the first tail slot, the second segment including a list of buffers;
returning the free buffer at the first tail slot by pushing the free buffer to a tail of the list of buffers in the second segment.

7. A non-transitory computer readable medium storing program code for performing parallel IO operations, the program code being executable to perform operations comprising:
requesting a free buffer from a single LRU buffer list in response to an IO request, the single LRU buffer list including a head portion, the head portion including a plurality of head slots respectively accessible in parallel;
selecting a first head slot from the plurality of head slots included in the head portion of the single LRU buffer list; and
obtaining the free buffer from the first head slot.

8. The computer readable medium of claim 7, wherein the operations further comprise:
identifying a first segment corresponding to the first head slot, the first segment including a list of buffers;
obtaining the free buffer from the first head slot by identifying a head buffer within the list of buffers included in the first segment and removing the head buffer as the free buffer.

9. The computer readable medium of claim 7, wherein the single LRU buffer list is accessible in parallel by a plurality of CPUs that are included on a multicore platform, the plurality of CPUs being respectively associated with the plurality of head slots, such that a first CPU is associated to the first head slot, a second CPU is associated to a second head slot, through a number N of CPUs and N corresponding head slots.

10. The computer readable medium of claim 9, wherein the single LRU buffer list includes a tail portion, the tail portion including a plurality of tail slots respectively accessible in parallel.

11. The computer readable medium of claim 10, wherein the operations further comprise:
returning the free buffer to the single LRU buffer list at a first tail slot of the plurality of tail slots, the first tail slot being associated with the first CPU.

12. The computer readable medium of claim 11, wherein the operations further comprise:
identifying a second segment corresponding to the first tail slot, the second segment including a list of buffers;
returning the free buffer at the first tail slot by pushing the free buffer to a tail of the list of buffers in the second segment.

13. An apparatus for LRU buffer management in performing parallel IO operations, the apparatus comprising:
a processor; and
a memory, the memory storing program code executable by the processor to perform operations comprising:
requesting a free buffer from a single LRU buffer list in response to an IO request, the single LRU buffer list including a head portion, the head portion including a plurality of head slots respectively accessible in parallel;
selecting a first head slot from the plurality of head slots included in the head portion of the single LRU buffer list; and
obtaining the free buffer from the first head slot.

14. The apparatus of claim 13, wherein the operations further comprise:
identifying a first segment corresponding to the first head slot, the first segment including a list of buffers;
obtaining the free buffer from the first head slot by identifying a head buffer within the list of buffers included in the first segment and removing the head buffer as the free buffer.

15. The apparatus of claim 13, wherein the single LRU buffer list is accessible in parallel by a plurality of CPUs that are included on a multicore platform, the plurality of CPUs being respectively associated with the plurality of head slots, such that a first CPU is associated to the first head slot, a second CPU is associated to a second head slot, through a number N of CPUs and N corresponding head slots.

16. The apparatus of claim 15, wherein the single LRU buffer list includes a tail portion, the tail portion including a plurality of tail slots respectively accessible in parallel.

17. The apparatus of claim 16, wherein the operations further comprise:
returning the free buffer to the single LRU buffer list at a first tail slot of the plurality of tail slots, the first tail slot being associated with the first CPU.

18. The apparatus of claim 17, wherein the operations further comprise:
identifying a second segment corresponding to the first tail slot, the second segment including a list of buffers;
returning the free buffer at the first tail slot by pushing the free buffer to a tail of the list of buffers in the second segment.

* * * * *